US012478575B2

(12) United States Patent
Colombo et al.

(10) Patent No.: US 12,478,575 B2
(45) Date of Patent: Nov. 25, 2025

(54) STABLE PERFUMING COMPOSITIONS HAVING GOOD SPRAY PROPERTIES

(71) Applicants: SOCIETE D'EXPLOITATION DE PRODUITS POUR LES INDUSTRIES CHIMIQUES—SEPPIC, Paris (FR); SEPPIC ITALIA SRL, Milan (IT)

(72) Inventors: Fabrizio Colombo, Milan (IT); Francesca Caccialanza, Milan (IT); Giovanni Grimaldi, Milan (IT)

(73) Assignees: SOCIETE D'EXPLOITATION DE PRODUITS POUR LES INDUSTRIES CHIMIQUES—SEPPIC, Paris (FR); SEPPIC ITALIA SRL, Milan (IT)

( * ) Notice: Subject to any disclaimer, the term of this patent is extended or adjusted under 35 U.S.C. 154(b) by 772 days.

(21) Appl. No.: 17/761,786

(22) PCT Filed: Sep. 10, 2020

(86) PCT No.: PCT/EP2020/075313
§ 371 (c)(1),
(2) Date: Mar. 18, 2022

(87) PCT Pub. No.: WO2021/052855
PCT Pub. Date: Mar. 25, 2021

(65) Prior Publication Data
US 2022/0370335 A1 Nov. 24, 2022

(30) Foreign Application Priority Data
Sep. 19, 2019 (EP) ..................... 19306126

(51) Int. Cl.
A61K 8/92 (2006.01)
A61K 8/06 (2006.01)
A61K 8/81 (2006.01)
A61Q 13/00 (2006.01)

(52) U.S. Cl.
CPC ............... *A61K 8/92* (2013.01); *A61K 8/062* (2013.01); *A61K 8/8141* (2013.01); *A61Q 13/00* (2013.01)

(58) Field of Classification Search
CPC .... A61K 8/062; A61K 8/8158; A61K 8/8141; A61K 8/92; A61K 8/604; A61K 2800/49; A61K 2800/87; C11B 9/00; A61Q 13/00
USPC .......................................................... 512/1
See application file for complete search history.

(56) References Cited

U.S. PATENT DOCUMENTS 8,512,684 B2 * 8/2013 Mallo .................. A61Q 19/005
424/59
2013/0150447 A1 6/2013 Barlerin 2016/0015609 A1 * 1/2016 Merat ....................... C08F 2/24
424/59
2016/0256367 A1 9/2016 Charbit
2016/0310396 A1 10/2016 Terisse
2017/0035675 A1 2/2017 Breton
2018/0116946 A1 5/2018 Taillebois

FOREIGN PATENT DOCUMENTS

| CN | 105705133 A | 6/2016 |
| CN | 105722496 A | 6/2016 |
| CN | 106413676 A | 2/2017 |
| CN | 107530271 A | 1/2018 |
| EP | 1055707 A1 | 11/2000 |
| EP | 3078365 A1 | 10/2016 |
| FR | 3043546 A1 | 5/2017 |
| JP | 2017506609 A | 3/2017 |
| JP | 2018512426 A | 5/2018 |
| JP | 2021505623 A | 2/2021 |
| KR | 20130115231 A | 10/2013 |
| WO | 02/32390 | 4/2002 |
| WO | 02/100372 | 12/2002 |
| WO | 03/035657 | 5/2003 |
| WO | 2015123239 A1 | 8/2015 |
| WO | 2016164421 A1 | 10/2016 |
| WO | 2018/109354 | 6/2018 |
| WO | 2019102116 A1 | 5/2019 |
| WO | 2019115911 A1 | 6/2019 |

OTHER PUBLICATIONS

Office Action, issued in Japanese Patent Application No. 2022-518180 dated Jul. 30, 2024.
International Search Report for PCT/EP2020/075313 mailed Nov. 18, 2020, 6 pages.
Written Opinion of the ISA for PCT/EP2020/075313 mailed Nov. 18, 2020, 7 pages.
EP Search Report, EP19306126.4, dated Mar. 20, 2020, 8 pages.
[Online] SEPPIC—Air Liquide, "Emulsifier range", 2018, https://latinamerica.in-cosmetics.com/_novadonments.54880?v=636838402553430000, 2 pages.
Office Action, issued in Chinese Patent Application No. 202080064889.3 dated Mar. 4, 2024.
Office Action, issued in Korean Patent Application No. 10-2022-7012523 dated Jun. 13, 2025.

* cited by examiner

Primary Examiner — Jessica Whiteley
(74) Attorney, Agent, or Firm — NIXON & VANDERHYE

(57) ABSTRACT

Disclosed is a composition in the form of an oil-in-water emulsion and including: a) at least one oil; b) at least one cross-linked anionic polyelectrolyte; c) at least one water-in-oil emulsifying surfactant including an alkylpolyxyloside having a non-linear branched alkyl radical and having 10 to 36 carbon atoms; d) at least one oil-in-water emulsifying surfactant; e) at least one hydrophobic perfuming substance; and f) water.

20 Claims, No Drawings

STABLE PERFUMING COMPOSITIONS HAVING GOOD SPRAY PROPERTIES

CROSS-REFERENCE RELATED TO APPLICATIONS

This application is the U.S. national phase of International Application No. PCT/EP2020/075313 filed Sep. 10, 2020 which designated the U.S. and claims priority to EP 19306126.4 filed Sep. 19, 2019, the entire contents of each of 5 which are hereby incorporated by reference.

BACKGROUND OF THE INVENTION

Field of the Invention

A subject matter of the invention is novel perfuming compositions which are stable and which possess good spraying properties, as well as a process for perfuming the skin, hair, scalp, lips, clothes or household linen employing the novel perfuming compositions, and the containers comprising said novel perfuming compositions.

Description of the Related Art

There is a recurring need in the cosmetics and perfumery industries to develop perfuming compositions comprising a reduced concentration of volatile alcohols, and even perfuming compositions devoid of volatile alcohols.

Such perfuming compositions exhibit numerous disadvantages related to the presence of these volatile alcohols and more particularly to the presence of ethanol. This is because, as these volatile alcohols can cause dryness of the skin and irritate the epidermis, they are sensitive to sunlight and their use in the field of perfumes is difficult because the smell of the volatile alcohol can interfere with the perfuming substances.

Water is a substitute of choice for volatile alcohols in perfuming compositions because its use makes it possible to reduce the content of volatile organic compounds in the atmosphere and to reduce or eliminate the flammable nature of perfuming compositions. Moreover, the perfumery and cosmetics industries also sell compositions requiring the presence of water, such as eaux de toilette, eaux de parfum, aqueous aftershave lotions, care waters and fresh waters. These aqueous perfumed cosmetic products are appreciated by consumers because they are characterized by a sensation of increased freshness.

However, as perfuming substances are generally hydrophobic substances, it proves necessary to use at least one third ingredient allowing them to be dissolved in the aqueous phase of perfuming compositions. Surfactants are generally solubilizing agents which are combined with hydrophobic perfuming substances to prepare aqueous perfuming compositions.

Commonly used surfactants include alkoxylated nonionic surfactants, such as polysorbates, such as ethoxylated lauroyl sorbitan esters with 20 moles of ethylene oxide, ethoxylated palmitoyl sorbitan esters with 20 moles of ethylene oxide, ethoxylated stearoyl sorbitan esters with 20 moles of ethylene oxide, ethoxylated oleyl sorbitan esters with 20 moles of ethylene oxide; ethoxylated fatty alcohols, ethoxylated fatty acids, ethoxylated fatty esters and more particularly ethoxylated fatty triglycerides, such as ethoxylated hydrogenated castor oil with 20, 40 or 60 moles of ethylene oxide and more particularly ethoxylated hydrogenated castor oil with 40 moles of ethylene oxide, commonly sold under the name "PEG-40 hydrogenated castor oil".

However, these ethoxylated surfactants exhibit the disadvantage of being prepared by the use of ethylene oxide, of which the residual contents, and the byproducts which they generate, are prohibited in cosmetic products intended for consumers, then involving the implementation of restrictive purification processes. In addition, polyethoxylated compounds are suspected of easily passing the skin barrier and of thus allowing faster access of residual ethylene oxide and its byproducts into the human body.

Starting from there, a problem which arises is that of providing a perfuming composition which is simultaneously devoid of alcohols, stable and sprayable.

SUMMARY OF THE INVENTION

A solution of the present invention is a perfuming composition ($C_1$) provided in the form of an emulsion of oil-in-water type and comprising:
a) at least one oil,
b) at least one crosslinked anionic polyelectrolyte (AP),
c) at least one emulsifying surfactant of water-in-oil type ($S_1$) comprising an alkyl polyxyloside possessing a nonlinear branched alkyl radical and comprising from 10 to 36 carbon atoms,
d) at least one emulsifying surfactant of oil-in-water type ($S_2$),
e) at least one hydrophobic perfuming substance, and
f) water.

Depending on the case, the composition according to the invention can exhibit one or more of the following characteristics:
said composition comprises at least one wax,
said composition comprises, per 100% of its weight:
a) from 1% to 30% by weight of oil, preferably from 1% to 25% by weight of oil;
b) from 0.05% to 2.5% by weight of the crosslinked anionic polyelectrolyte (AP), preferably from 0.1% to 2.5% by weight and even more preferably from 0.5% to 2.5% by weight of the crosslinked anionic polyelectrolyte (AP);
c) from 0.05% to 2.5% by weight of the surfactant of water-in-oil type ($S_1$), preferably from 0.1% to 2.5% by weight and even more preferably from 0.5% to 2.5% by weight of the surfactant of water-in-oil type ($S_1$);
d) from 0.5% to 5% by weight of the surfactant of oil-in-water type ($S_2$), preferably from 1% to 5% by weight of the surfactant of oil-in-water type ($S_2$);
e) from 0.5% to 10% by weight of the hydrophobic perfuming substance, preferably from 1% to 10% by weight of at least one hydrophobic perfuming substance;
f) from 50% to 97.9% by weight of water, preferably from 55% to 97.8% by weight and even more preferably from 55% to 96% by weight of water.

Preferably, the sum of the proportions by weight of the constituents (a), (b), (c), (d), (e) and (f) is equal to 100% of the weight of the composition ($C_1$).

the emulsifying surfactant of water-in-oil type ($S_1$) comprises at least one composition of alkyl polyglycosides ($C'_1$) represented by the formula (I):

$$R_2-O-(X)_x-H \qquad (I)$$

in which x represents a decimal number of between 1.05 and 2.5, X represents the xylosyl or α,β-D-xylopyranosyl radical, obtained from the deletion of the hemiacetal hydroxyl group of α,β-D-xylopyranose, and $R_2$ represents a radical of formula (II):

$$CH(C_tH_{2t+1})(C_vH_{2v+1})CH_2— \qquad (II)$$

in which t is an integer of between 6 and 18, v is an integer of between 4 and 18 and the sum t+v is greater than or equal to 10 and less than or equal to 22.

the composition ($C'_1$) consists of a mixture of compounds represented by the formulae ($I_1$), ($I_2$), ($I_3$), ($I_4$) and ($I_5$):

$$R_2—O—(X)_1—H \qquad (I_1)$$

$$R_2—O—(X)_2—H \qquad (I_2)$$

$$R_2—O—(X)_3—H \qquad (I_3)$$

$$R_2—O—(X)_4—H \qquad (I_4)$$

$$R_2—O—(X)_5—H \qquad (I_5)$$

in the respective molar proportions a1, a2, a3, a4 and a5, such that:
 the sum a1+a2+a3+a4+a5 is equal to 1, and that the sum a1+2a2+3a3+4a4+5a5 is equal to x.
 the emulsifying surfactant of water-in-oil type comprises a fatty alcohol of formula (III):

$$CH(C_tH_{2t+1})(C_vH_{2v+1})CH_2—OH \qquad (III)$$

in which t is an integer of between 6 and 18, v is an integer of between 4 and 18 and the sum t+v is greater than or equal to 14.

the emulsifying surfactant of oil-in-water type ($S_2$) comprises:
 a compound of formula (IV):

$$R_1—(C=O)—[O—CH_2—CH(OH)—CH_2]_p—OH \qquad (IV).$$

in which p represents an integer greater than or equal to 1 and less than or equal to 15 and in which the group $R_1—(C=O)—$ represents a saturated or unsaturated and linear or branched acyl radical comprising from 6 to 22 carbon atoms, and/or
 a composition ($C'_2$) of alkyl polyglycosides represented by the formula (VI):

$$R_3—O\text{-}(G)_{x'}—H \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and $R_3$ represents a radical chosen from the elements of the group consisting of the n-dodecyl, n-tetradecyl, n-hexadecyl, n-octadecyl, n-eicosyl and n-behenyl radicals. 10 the composition ($C'_2$) consists of a mixture of compounds represented by the formulae ($VI_1$), ($VI_2$), ($VI_3$), ($VI_4$) and ($VI_5$):

$$R_3—O\text{-}(G)_1\text{-}H \qquad (VI_1)$$

$$R_3—O\text{-}(G)_2\text{-}H \qquad (VI_2)$$

$$R_3—O\text{-}(G)_3\text{-}H \qquad (VI_3)$$

$$R_3—O\text{-}(G)_4\text{-}H \qquad (VI_4)$$

$$R_3—O\text{-}(G)_5\text{-}H \qquad (VI_5)$$

in the respective molar proportions a1, a2, a3, a4 and a5, such that:
 the sum a1+a2+a3+a4+a5 is equal to 1, and that the sum a1+2a2+3a3+4a4+5a5 is equal to x.

the emulsifying surfactant of oil-in-water type ($S_2$) comprises a compound of formula (IV) and at least one compound of formula (V):

$$HO—[CH_2—CH(OH)—CH_2—O]_n—H \qquad (V),$$

in which n, which is identical to or different from p, represents an integer of greater than or equal to 1 and of less than or equal to 15.

the emulsifying agent of oil-in-water type ($S_2$) comprises a composition ($C'_2$) of alkyl polyglycosides and a fatty alcohol of formula (VII):

$$R'_3—OH \qquad (VII),$$

in which R's represents a radical chosen from the elements of the group consisting of the n-dodecyl, n-tetradecyl, n-hexadecyl, n-octadecyl, n-eicosyl and n-behenyl radicals, and with $R'_3$ identical to or different from $R_3$.

the $R_2$ radical represents the 2-octyl-1-dodecyl radical in the formula ($I_1$) obtained from the deletion of the hydroxyl group of 2-octyl-1-dodecanol, and for which t is equal to 10 and v is equal to 8 in the formula (II).

the crosslinked anionic polyelectrolyte (AP) comprises a proportion of greater than or equal to 25 mol % of monomer units resulting from 2-methyl-2-[(1-oxo-2-propenyl)amino]-1-propanesulfonic acid in free acid or partially or completely salified form.

the hydrophobic perfuming substance (A) is chosen from the elements of the group consisting of the following olfactory families: Citrus, Floral, Fougère, Chypre, Woody.

In the definition of the composition ($C_1$) which is a subject matter of the present invention, "oil" denotes a compound and/or a mixture of compounds insoluble in water and liquid at 25° C., and more particularly:
 linear alkanes comprising from 11 to 19 carbon atoms;
 branched alkanes comprising from 7 to 40 carbon atoms, such as isododecane, isopentadecane, isohexadecane, isoheptadecane, isooctadecane, isononadecane or isoeicosane, or mixtures of some of them, such as those mentioned below and identified by their INCI name: $C_{7\text{-}8}$ isoparaffin, $C_{8\text{-}9}$ isoparaffin, $C_{9\text{-}11}$ isoparaffin, $C_{9\text{-}12}$ isoparaffin, $C_{9\text{-}13}$ isoparaffin, $C_{9\text{-}14}$ isoparaffin, $C_{9\text{-}16}$ isoparaffin, $C_{10\text{-}11}$ isoparaffin, $C_{10\text{-}12}$ isoparaffin, $C_{10\text{-}13}$ isoparaffin, $C_{11\text{-}12}$ isoparaffin, $C_{11\text{-}13}$ isoparaffin, $C_{11\text{-}14}$ isoparaffin, $C_{12\text{-}14}$ isoparaffin, $C_{12\text{-}20}$ isoparaffin, $C_{13\text{-}14}$ isoparaffin, $C_{13\text{-}16}$ isoparaffin;
 cycloalkanes optionally substituted by one or more linear or branched alkyl radicals;
 white mineral oils, such as those sold under the following names: Marcol™ 52, Marcol™ 82, Drakeol™ 6VR, Eolane™ 130, Eolane™ 150;
 hemisqualane (or 2,6,10-trimethyldodecane; CAS number: 3891-98-3), squalane (or 2,6,10,15,19,23-hexamethyltetracosane), hydrogenated polyisobutene or hydrogenated polydecene;
 mixtures of alkanes comprising from 15 to 19 carbon atoms, said alkanes being linear alkanes, branched alkanes and cycloalkanes, and more particularly the mixture ($M_1$) which comprises, per 100% of its weight, a proportion by weight of branched alkanes of greater than or equal to 90% and less than or equal to 100%; a proportion by weight of linear alkanes of greater than or equal to 0% and less than or equal to 9% and more particularly less than 5%; and a proportion by weight of cycloalkanes of greater than or equal to 0% and less than or equal to 1%, for example the mixtures sold under the names Emogreen™ L15 and Emogreen™ L19;

fatty alcohol ethers of formula (VIII):

$$Z_1—O—Z_2 \quad (VIII)$$

in which $Z_1$ and $Z_2$, which are identical or different, represent a linear or branched alkyl radical comprising from 5 to 18 carbon atoms, for example dioctyl ether, didecyl ether, didodecyl ether, dodecyl octyl ether, dihexadecyl ether, (1,3-dimethylbutyl) tetradecyl ether, (1,3-dimethylbutyl) hexadecyl ether, bis(1,3-dimethylbutyl) ether or dihexyl ether;

monoesters of fatty acids and of alcohols of formula (IX):

$$R'_4—(C=O)—O—R'_5 \quad (IX),$$

in which $R'_4—(C=O)$ represents a saturated or unsaturated and linear or branched acyl radical comprising from 8 to 24 carbon atoms and R's represents, independently of $R'_4$, a saturated or unsaturated and linear or branched hydrocarbon chain comprising from 1 to 24 carbon atoms, for example methyl laurate, ethyl laurate, propyl laurate, isopropyl laurate, butyl laurate, 2-butyl laurate, hexyl laurate, methyl cocoate, ethyl cocoate, propyl cocoate, isopropyl cocoate, butyl cocoate, 2-butyl cocoate, hexyl cocoate, methyl myristate, ethyl myristate, propyl myristate, isopropyl myristate, butyl myristate, 2-butyl myristate, hexyl myristate, octyl myristate, methyl palmitate, ethyl palmitate, propyl palmitate, isopropyl palmitate, butyl palmitate, 2-butyl palmitate, hexyl palmitate, octyl palmitate, methyl oleate, ethyl oleate, propyl oleate, isopropyl oleate, butyl oleate, 2-butyl oleate, hexyl oleate, octyl oleate, methyl stearate, ethyl stearate, propyl stearate, isopropyl stearate, butyl stearate, 2-butyl stearate, hexyl stearate, octyl stearate, methyl isostearate, ethyl isostearate, propyl isostearate, isopropyl isostearate, butyl isostearate, 2-butyl isostearate, hexyl isostearate or isostearyl isostearate;

diesters of fatty acids and of glycerol of formula (X) and of formula (XI):

$$R'_6—(C=O)—O—CH_2—CH(OH)—CH_2—O—(C=O)—R'_7 \quad (X)$$

$$R'_8—(C=O)—O—CH_2—CH[O—(C=O)—R'_9]—CH_2—OH \quad (XI),$$

in which formulae (XI) and (XII) $R'_6—(C=O)$, $R'_7—(C=O)$, $R'_8—(C=O)$ and $R'_9—(C=O)$, which are identical or different, represent a saturated or unsaturated and linear or branched acyl group comprising from 8 to 24 carbon atoms;

triesters of fatty acids and of glycerol of formula (XII):

$$R'_{10}—(C=O)—O—CH_2—CH[O—(C=O)—R'_{11}]—CH_2—O—(C=O)—R'_{12} \quad (XII),$$

in which $R'_{10}—(C=O)$, $R'_{11}—(C=O)$ and $R'_{12}—(C=O)$, which are identical or different, represent a saturated or unsaturated and linear or branched acyl group comprising from 8 to 24 carbon atoms;

vegetable oils, such as phytosqualane, sweet almond oil, coconut oil, castor oil, jojoba oil, olive oil, rapeseed oil, peanut oil, sunflower oil, wheat germ oil, corn germ oil, soybean oil, cottonseed oil, alfalfa oil, poppy oil, red kuri squash oil, evening primrose oil, millet oil, barley oil, rye oil, safflower oil, candlenut oil, passionflower oil, hazelnut oil, palm oil, shea butter, apricot kernel oil, calophyllum oil, sisymbrium oil, avocado oil, calendula oil or oils resulting from flowers or edible plants;

ethoxylated vegetable oils.

A wax is optionally added to the oil. Within the meaning of the present invention, "wax" present in the fatty phase of the composition ($C_1$) existing in the form of an emulsion of oil-in-water type as defined above denotes chemical substances or mixtures of chemical substances which are insoluble in water and which exist under a solid appearance at a temperature of 45° C.

The wax is more particularly chosen from beeswax, carnauba wax, candelilla wax, ouricury wax, Japan wax, cork fiber wax, sugarcane wax, paraffin waxes, lignite waxes, microcrystalline waxes, lanolin wax; ozokerite; polyethylene wax; silicone waxes; vegetable waxes; fatty alcohols and fatty acids which are solid at ambient temperature; glycerides which are solid at ambient temperature.

Within the meaning of the present invention, "emulsifying surfactant of water-in-oil type" denotes an amphiphilic chemical substance or a chemical composition of amphiphilic chemical substances which makes it possible to stabilize a dispersion of water or of aqueous phase in a continuous fatty phase, such as, for example, an oil and/or a wax. Such emulsifying surfactants of water-in-oil type are generally characterized by a value of the hydrophilic/lipophilic balance of less than or equal to 8.0 and more particularly of less than or equal to 7.0.

Such anemulsifying surfactant of water-in-oil type ($S_1$) is more particularly chosen from the elements of the group consisting of i) compositions of alkyl polyglycosides ($C'_1$) represented by the formula (I) as defined above, combined or not with a fatty alcohol of formula (III) as defined above.

According to a specific aspect of the present invention, $R_2$ represents a radical of formula (II) in which t is an integer of between 6 and 10, v is an integer of between 8 and 12 and the sum t+v is greater than or equal to 14 and less than or equal to 18.

According to a specific aspect of the present invention, $R_2$ represents a radical of formula (II) chosen from the group consisting of the 2-hexyloctyl, 2-hexyldecyl, 2-octyldecyl, 2-hexyldodecyl and 2-octyldodecyl radicals.

According to a more specific aspect, a subject matter of the invention is a composition ($C_1$) for which the radical $R_2$ represents the 2-octyl-1-dodecyl radical in the formula (II) obtained from the deletion of the hydroxyl group of 2-octyl-1-dodecanol, and for which t is equal to 10 and v is equal to 8 in the formulae (II) and (III).

In the composition ($C'_1$), present in the composition ($C_1$) which is a subject matter of the present invention, X represents the xylosyl or α,β-D-xylopyranosyl radical, obtained from the deletion of the hemiacetal hydroxyl group of α,β-D-xylopyranose, and the oligomeric structure $(X)_x$ can be provided in any form of isomerism, whether optical isomerism, geometric isomerism or positional isomerism; it can also represent a mixture of isomers. In the formula (I) as defined above, the $R_2$—O— group is bonded to X via the anomeric carbon of the saccharide residue, so as to form an acetal functional group.

According to an even more specific aspect, in the definition of the formula (I) representing the composition ($C'_1$) included in the composition ($C_1$) which is a subject matter of the present invention, x represents a decimal number of greater than or equal to 1.05 and less than or equal to 2.0 and even more particularly of greater than or equal to 1.15 and less than or equal to 2.0.

According to an even more specific aspect, in the definition of the formula (I) as defined above, $R_2$ represents the 2-octyldodecyl radical, X represents the xylosyl or α,β-D-xylopyranosyl radical, obtained from the deletion of the hemiacetal hydroxyl group of α,β-D-xylopyranose, and x represents a decimal number of greater than or equal to 1.05 and less than or equal to 2.5.

According to a specific aspect, the emulsifying surfactant of water-in-oil type ($S_1$) comprises, per 100% of its weight:
from 10% to 50% by weight, more particularly from 15% to 40% by weight and even more particularly from 20% to 30% by weight of at least one composition ($C'_1$) represented by the formula (I) as defined above,
from 90% to 50% by weight, more particularly from 85% to 60% by weight and even more particularly from 80% to 70% by weight of at least one fatty alcohol of formula (III'):

R'$_2$—OH (III'), in which R'$_2$, which is identical to or different from R$_2$, represents a radical of formula (II) chosen from the group consisting of the 2-hexyloctyl, 2-hexyldecyl, 2-octyldecyl, 2-hexyldodecyl and 2-octyldodecyl radicals.

According to a specific aspect, the R'$_2$ radical of the formula (III') is identical to the R$_2$ radical of the formula (I).

According to another more specific aspect, the emulsifying surfactant of water-in-oil type ($S_1$) comprises, per 100% of its weight:
from 10% to 50% by weight, more particularly from 15% to 40% by weight and even more particularly from 20% to 30% by weight of at least one composition ($C'_1$) represented by the formula (I) for which R$_2$ represents the 2-octyldodecyl radical, X represents the xylosyl or α,β-D-xylopyranosyl radical, obtained from the deletion of the hemiacetal hydroxyl group of α,β-D-xylopyranose, and x represents a decimal number of greater than or equal to 1.05 and less than or equal to 2.5,
from 90% to 50% by weight, more particularly from 85% to 60% by weight and even more particularly from 80% to 70% by weight of at least one fatty alcohol of formula (III') for which R'$_2$, which is identical to R$_2$, represents the 2-octyldodecyl radical.

According to another specific aspect, the composition ($C_1$) which is a subject matter of the present invention comprises, per 100% of its weight, from 0.5% to 5% by weight and even more particularly from 1% to 5% by weight of at least one emulsifying surfactant of oil-in-water type ($S_2$) as defined above.

Within the meaning of the present invention, "emulsifying surfactant of oil-in-water type" denotes an amphiphilic chemical substance or a chemical composition of amphiphilic chemical substances which makes it possible to stabilize a dispersion of a fatty phase, such as, for example, an oil and/or a wax, in a continuous aqueous phase.

Such emulsifying surfactants of oil-in-water type ($S_2$) are generally characterized by a value of the hydrophilic/lipophilic balance of greater than 8.0 and more particularly of less than or equal to 20.0.

Such an emulsifying surfactant of oil-in-water type ($S_2$) is more particularly chosen from the elements of the group consisting of i) a compound of formula (IV), ii) a composition ($C_2$) of at least one compound of formula (IV) and of at least one compound of formula (V), iii) a composition ($C'_2$) of alkyl polyglycosides represented by the formula (VI), combined or not with a fatty alcohol of formula (VII).

According to a specific aspect, a subject matter of the present invention is a composition ($C_1$) for which, in the formula (IV), p represents an integer of greater than or equal to 2 and less than or equal to 15, more particularly of greater than or equal to 2 and less than or equal to 10 and even more particularly of greater than or equal to 4 and less than or equal to 10.

According to another specific aspect, a subject matter of the present invention is a composition ($C_1$) for which, in the formula (IV), the R$_1$—(C═O)— group represents a saturated or unsaturated and linear or branched acyl radical comprising from 10 to 22 carbon atoms and more particularly a radical chosen from the n-decanoyl, n-dodecanoyl, n-tetradecanoyl, n-hexadecanoyl, n-octadecanoyl, n-eicosanoyl, n-docosanoyl, n-oleyl, n-linoleyl, n-linolenoyl or isostearyl radicals.

According to another more specific aspect, a subject matter of the present invention is a composition ($C_1$) for which, in the formula (IV), p represents an integer greater than or equal to 4 and less than or equal to 10 and the R$_1$—(C═O)— group represents an acyl radical chosen from the members of the group comprising the n-decanoyl radical, the n-dodecanoyl radical, the n-tetradecanoyl radical, the n-hexadecanoyl radical, the n-octadecanoyl radical, the n-eicosanoyl radical and the n-docosanoyl radical.

According to another specific aspect, a subject matter of the present invention is a composition ($C_1$) for which, in the formula (V), n, which is identical to or different from p, represents an integer of greater than or equal to 2 and less than or equal to 15, more particularly of greater than or equal to 2 and less than or equal to 10 and even more particularly of greater than or equal to 4 and less than or equal to 10.

According to another specific aspect, a subject matter of the present invention is a composition ($C_1$) for which, in the formula (V), n, which is identical or to p, represents an integer greater than or equal to 4 and less than or equal to 10.

In the definition of the formula (VI) representing the composition ($C'_2$) included in the composition ($C_1$) which is a subject matter of the present invention, G represents the glucosyl or α,β-D-glucopyranosyl radical, obtained from the deletion of the hemiacetal hydroxyl group of α,β-D-glucopyranose, and the oligomeric structure (G)$_x$ can be provided in any form of isomerism, whether optical isomerism, geometric isomerism or positional isomerism; it can also represent a mixture of isomers. In the formula (VI) as defined above, the R$_3$—O— group is bonded to G via the anomeric carbon of the saccharide residue, so as to form an acetal functional group.

According to a more specific aspect, in the definition of the formula (VI) representing the composition ($C'_2$) included in the composition ($C_1$) which is a subject matter of the present invention, x' represents a decimal number of greater than or equal to 1.05 and less than or equal to 2.0 and even more particularly of greater than or equal to 1.15 and less than or equal to 2.0.

According to another more specific aspect, in the definition of the formula (VI) representing the composition ($C'_2$) included in the composition ($C_1$) which is a subject matter of the present invention, R$_3$ represents a radical chosen from the elements of the group consisting of the n-dodecyl radical, the n-tetradecyl radical and the n-hexadecyl radical.

According to another even more specific aspect, in the definition of the formula (VI) representing the composition ($C'_2$) included in the composition ($C_1$) which is a subject matter of the present invention, R$_3$ represents a radical chosen from the elements of the group consisting of the n-dodecyl radical, the n-tetradecyl radical and the n-hexadecyl radical and x' represents a decimal number of greater than or equal to 1.05 and less than or equal to 2.5, more particularly of greater than or equal to 1.05 and less than or equal to 2.0 and even more particularly of greater than or equal to 1.15 and less than or equal to 2.0.

According to another aspect, in the composition ($C_1$) which is a subject matter of the present invention, the emulsifying surfactant of oil-in-water type ($S_2$) comprises a composition of alkyl polyglycosides ($C'_2$) represented by the formula (VI) and a fatty alcohol of formula (VII) as defined above.

According to another more specific aspect, in the composition ($C_1$) which is a subject matter of the present invention, the emulsifying surfactant of oil-in-water type ($S_2$) comprises, per 100% of its weight:

from 10% to 50% by weight, more particularly from 15% to 40% by weight and even more particularly from 20% to 30% by weight of at least one composition ($C'_2$) represented by the formula (VI) for which $R_3$ represents at least one radical chosen from the elements of the group consisting of the n-dodecyl radical, the n-tetradecyl radical and the n-hexadecyl radical, G represents the glucosyl or α,β-D-glucopyranosyl radical, obtained from the deletion of the hemiacetal hydroxyl group of α,β-D-glucopyranose, and x' represents a decimal number of greater than or equal to 1.05 and less than or equal to 2.0, from 90% to 50% by weight, more particularly from 85% to 60% by weight and even more particularly from 80% to 70% by weight of at least one fatty alcohol of formula (VII) for which $R'_3$, which is identical to $R_3$, represents at least one radical chosen from the elements of the group consisting of the n-dodecyl radical, the n-tetradecyl radical and the n-hexadecyl radical.

Crosslinked anionic polyelectrolyte (AP) denotes, in the definition of the composition ($C_1$) for topical use which is a subject matter of the present invention, a nonlinear crosslinked anionic polyelectrolyte provided in the form of a three-dimensional network which is insoluble in water but swellable in water and which results in a chemical gel being obtained.

According to a specific aspect, in the composition ($C_1$) which is a subject matter of the present invention, the crosslinked anionic polyelectrolyte (AP) comprises, per 100 mol %, a proportion of greater than or equal to 25 mol % and less than or equal to 100 mol % of monomer units resulting from 2-methyl-2-[(1-oxo-2-propenyl)amino]-1-propanesulfonic acid in free acid or partially or completely salified form.

According to a specific aspect, the crosslinked anionic polyelectrolyte (AP) comprises, per 100 mol %:

(a1)—a proportion of greater than or equal to 25 mol % and less than or equal to 100 mol % of monomer units resulting from 2-methyl-2-[(1-oxo-2-propenyl)amino]-1-propanesulfonic acid in free acid or partially or completely salified form;

(a2)—optionally, a proportion of greater than 0 mol % and less than or equal to 75 mol % of monomer units resulting from at least one monomer chosen from the elements of the group consisting of acrylamide, N,N-dimethylacrylamide, methacrylamide or N-isopropylacrylamide;

(a3)—optionally, a proportion of greater than 0 mol % and less than or equal to 20 mol %, more particularly of greater than 0 mol % and less than or equal to 15 mol % and even more particularly of greater than or equal to 0 mol % and less than or equal to 10 mol % of monomer units resulting from at least one monomer chosen from the elements of the group consisting of 2-hydroxyethyl acrylate, 2,3-dihydroxypropyl acrylate, 2-hydroxyethyl methacrylate, 2,3-dihydroxypropyl methacrylate and vinylpyrrolidone;

(a4)—optionally, a proportion of greater than 0 mol % and less than or equal to 75 mol % of monomer units resulting from at least one monomer chosen from the elements of the group consisting of acrylic acid, methacrylic acid, 2-carboxyethylacrylic acid, itaconic acid, maleic acid and 3-methyl-3-[(1-oxo-2-propenyl)amino]butanoic acid, the carboxyl functional group of said monomers being in free acid, partially salified or completely salified form;

(a5)—optionally, a proportion of greater than 0 mol % and less than or equal to 5 mol % of at least one monomer of formula (M1):

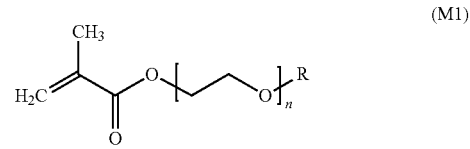

(M1)

in which R represents a linear or branched alkyl radical comprising from 8 to 20 carbon atoms and n represents an integer of greater than or equal to 0 and less than or equal to 20;

(a6)—a proportion of greater than 0 mol % and less than or equal to 1 mol % of monomer units resulting from at least one diethylenic or polyethylenic crosslinking monomer; the sum of said molar proportions of monomer units according to a1), a2), a3), a4), a5) and a6) being equal to 100 mol %.

Within the meaning of the present invention, the term "salified" indicates that the acid functional group present in a monomer exists in an anionic form combined in salt form with a cation, in particular alkali metal salts, such as sodium or potassium cations, or such as cations of nitrogenous bases, such as the ammonium salt, the lysine salt or the monoethanolamine salt ($HOCH_2$—$CH_2$—$NH_4^+$). They are preferably sodium or ammonium salts.

At least one diethylenic or polyethylenic crosslinking monomer, in the definition of said crosslinked anionic polyelectrolyte (AP), denotes in particular a monomer chosen from the elements of the group consisting of methylenebis(acrylamide), ethylene glycol dimethacrylate, diethylene glycol diacrylate, ethylene glycol diacrylate, diallylurea, triallylamine, trimethylolpropane triacrylate, diallyloxyacetic acid or one of its salts, such as sodium diallyloxyacetate, or a mixture of these compounds; and more particularly a monomer chosen from ethylene glycol dimethacrylate, triallylamine, trimethylolpropane triacrylate or methylenebis(acrylamide) or a mixture of these compounds.

According to another specific aspect of the present invention, the composition ($C_1$) is characterized in that said crosslinking monomer as defined above is employed in a molar proportion of less than or equal to 0.5%, more particularly less than or equal to 0.25% and very particularly less than or equal to 0.1%; it is more particularly greater than or equal to 0.005 mol %.

The crosslinked anionic polyelectrolyte (AP) employed in the composition ($C_1$) for topical use which is a subject matter of the present invention can also comprise various additives, such as complexing agents, transfer agents or chain-limiting agents.

The crosslinked anionic polyelectrolyte (AP) employed in the composition ($C_1$) for topical use which is a subject matter of the present invention can be prepared by the employment of a radical polymerization process, such as, for example, processes of solution polymerization, suspension polymerization, inverse suspension polymerization, emulsion polymerization, inverse emulsion polymerization or polymerization in solvent medium followed by a stage of precipitation of the polymer formed.

According to a more specific aspect, the crosslinked anionic polyelectrolyte (AP) employed in the composition ($C_1$) for topical use which is a subject matter of the present invention can be prepared by the employment of a process of polymerization in solvent medium followed by a stage of precipitation of the polymer formed, or of inverse emulsion polymerization optionally followed by a stage of concentration and/or of atomization.

According to a more specific aspect, the crosslinked anionic polyelectrolyte (AP) employed in the composition ($C_1$) for topical use which is a subject matter of the present invention can be prepared according to one of the processes described above and can involve the use of transfer agents or chain-limiting agents. The transfer agents or chain-limiting agents are more particularly chosen from the group consisting of sodium hypophosphite, alcohols of low molecular weights, for example methanol, ethanol, 1-propanol, isopropanol or butanol, thiols, for example 2-mercaptoethanol, transfer agents comprising a sulfonate functional group, for example sodium methallylsulfonate, or mixtures of said transfer agents. The transfer agents or chain-limiting agents are more particularly used in molar proportions, expressed with respect to the total number of moles of monomers employed, of from 0.001 mol % to 1 mol %, more particularly from 0.001 mol % to 0.5 mol % and very particularly from 0.001 mol % to 0.1 mol %.

According to another specific aspect of the present invention, said crosslinked anionic polyelectrolyte (AP) is an element of the group consisting of a homopolymer of 2-methyl-2-[(1-oxo-2-propenyl)amino]-1-propanesulfonic acid partially or completely salified in sodium salt or ammonium salt form, crosslinked by triallylamine and/or methylenebis(acrylamide); a copolymer of 2-methyl-2-[(1-oxo-2-propenyl)amino]-1-propanesulfonic acid partially or completely salified in sodium salt or ammonium salt form and of acrylic acid partially or completely salified in sodium salt or ammonium salt form, crosslinked by triallylamine and/or methylenebis(acrylamide); a copolymer of 2-methyl-2-[(1-oxo-2-propenyl)amino]-1-propanesulfonic acid ($\gamma$) partially or completely salified in sodium salt or ammonium salt form and of acrylic acid ($\delta$) partially or completely salified in sodium salt form in a ($\gamma$)/($\delta$) molar ratio of greater than or equal to 30/70 and less than or equal to 90/10, crosslinked by triallylamine and/or methylenebis(acrylamide); a copolymer of 2-methyl-2-[(1-oxo-2-propenyl)amino]-1-propanesulfonic acid ($\gamma$) partially or completely salified in sodium salt form and of acrylic acid ($\delta$) partially or completely salified in sodium salt form in a ($\gamma$)/($\delta$) molar ratio of greater than or equal to 40/60 and less than or equal to 90/10, crosslinked by triallylamine and/or methylenebis(acrylamide); a copolymer of 2-methyl-2-[(1-oxo-2-propenyl)amino]-1-propanesulfonic acid ($\gamma$) partially or completely salified in sodium salt form and of acrylamide ($\varepsilon$) in a ($\gamma$)/($\varepsilon$) molar ratio of greater than or equal to 30/70 and less than or equal to 90/10, crosslinked by triallylamine and/or methylenebis(acrylamide); a copolymer of 2-methyl-2-[(1-oxo-2-propenyl)amino]-1-propanesulfonic acid ($\gamma$) partially or completely salified in sodium salt form and of hydroxyethyl acrylate ($\zeta$) in a ($\gamma$)/($\zeta$) molar ratio of greater than or equal to 30/70 and less than or equal to 90/10, crosslinked by triallylamine and/or methylenebis(acrylamide); a terpolymer crosslinked by triallylamine and/or methylenebis(acrylamide) of 2-methyl-2-[(1-oxo-2-propenyl)amino]-1-propanesulfonic acid partially or completely salified in sodium salt or ammonium salt form, of acrylamide and of acrylic acid partially or completely salified in sodium salt or ammonium salt form; a terpolymer crosslinked by triallylamine and/or methylenebis(acrylamide) of 2-methyl-2-[(1-oxo-2-propenyl)amino]-1-propanesulfonic acid partially or completely salified in sodium salt or ammonium salt form in a molar proportion of greater than or equal to 30% and less than or equal to 45%, of acrylamide in a molar proportion of greater than or equal to 45% and less than or equal to 68% and of acrylic acid partially or completely salified in sodium salt or ammonium salt form in a molar proportion of greater than or equal to 2% and less than or equal to 10%; a terpolymer crosslinked by triallylamine and/or methylenebis(acrylamide) of 2-methyl-2-[(1-oxo-2-propenyl)amino]-1-propanesulfonic acid partially or completely salified in sodium salt or ammonium salt form in a molar proportion of greater than or equal to 30% and less than or equal to 45%, of acrylamide in a molar proportion of greater than or equal to 47% and less than or equal to 68% and of acrylic acid partially or completely salified in sodium salt or ammonium salt form in a molar proportion of greater than or equal to 2% and less than or equal to 8%; a terpolymer crosslinked by trimethylolpropane triacrylate and/or triallylamine and/or methylenebis(acrylamide) of 2-methyl-2-[(1-oxo-2-propenyl)amino]-1-propanesulfonic acid partially or completely salified in sodium salt or ammonium salt form in a molar proportion of greater than or equal to 60% and less than or equal to 80%, of N,N-dimethylacrylamide in a molar proportion of greater than or equal to 15% and less than or equal to 39.5% and of tetraethoxylated lauryl methacrylate in a molar proportion of greater than or equal to 0.5% and less than or equal to 5%; a tetrapolymer crosslinked by trimethylolpropane triacrylate and/or triallylamine and/or methylenebis(acrylamide) of 2-methyl-2-[(1-oxo-2-propenyl)amino]-1-propanesulfonic acid partially or completely salified in sodium salt or ammonium salt form in a molar proportion of greater than or equal to 60% and less than or equal to 80%, of N,N-dimethylacrylamide in a molar proportion of greater than or equal to 15% and less than or equal to 39%, of lauryl methacrylate in a molar proportion of greater than or equal to 0.5% and less than or equal to 2.5% and of stearyl methacrylate in a molar proportion of greater than or equal to 0.5% and less than or equal to 2.5%.

Hydrophobic perfuming substance (A) denotes, in the composition ($C_1$) as defined above, any hydrophobic perfume capable of giving off a more or less persistent odor, said perfume belonging to one of the olfactory families as established by the Société Française des Parfumeurs [French Society of Perfumers].

This classification consists of the list of the following odor families: Citrus family, Floral family, Fougère family, Chypre family, Woody family, Amber-Oriental family and Leather family.

According to another specific aspect, a subject matter of the present invention is a composition ($C_1$) for which the hydrophobic perfuming substance (A) is chosen from the elements of the group consisting of the following olfactory families: Citrus, Floral, Fougère, Chypre, Woody.

The combination of different hydrophobic perfuming substances makes it possible to produce a pleasant, more or less persistent, olfactory signature.

According to a more specific aspect, a subject matter of the present invention is a composition ($C_1$) for which the hydrophobic perfuming substance (A) is chosen from at least one of the elements of the group consisting of Citrus Floral Chypre, Floral Woody Fruity, Floral Fruity, Fougère Fruity, Chypre Fruity, Chypre Floral, Woody Fruity, Spicy Floral Amber, Amber Floral Fruity.

The hydrophobic perfuming substance (A) can be chosen from hydrophobic perfuming substances of animal or plant natural origin or of synthetic origin.

The hydrophobic perfuming substances of animal origin include musk, castoreum, civet, ambergris, beeswax absolute and hyraceum.

The hydrophobic perfuming substances of plant origin can be extracted from different parts of plants, such as the flower, leaf, stem, bark, wood, wood moss, fruit, bud, seed, root, herbs, plant resins or lichens.

The hydrophobic perfuming substances of plant origin resulting from the extraction of flowers include those resulting from the extraction of rose flowers, jasmine flowers, tuberose flowers, champaca flowers, frangipani (ylang-ylang) flowers, lotus flowers, mimosa flowers, carnation flowers, osmanthus flowers, acacia flowers, orange blossoms, narcissus flowers, lavender flowers and gardenia flowers.

The hydrophobic perfuming substances of plant origin resulting from the extraction of buds include those resulting from the extraction of blackcurrant buds.

The hydrophobic perfuming substances of plant origin resulting from the extraction of mosses include those resulting from the extraction of oak moss and beach moss.

The hydrophobic perfuming substances of plant origin resulting from the extraction of leaves include the hydrophobic perfuming substances resulting from the extraction of acacia leaves, basil leaves, valerian leaves, gentian leaves, violet leaves, geranium leaves, labdanum leaves, rosemary leaves, patchouli leaves and verbena leaves.

The hydrophobic perfuming substances of plant origin resulting from the extraction of bark include the hydrophobic perfuming substances resulting from the extraction of cinnamon bark, ash bark, cassia bark, cascarilla bark and birch bark.

The hydrophobic perfuming substances of plant origin resulting from the extraction of wood include the hydrophobic perfuming substances resulting from the extraction of sandalwood, cedar wood, palisander wood, aloeswood and guaiac wood.

The hydrophobic perfuming substances of plant origin resulting from the extraction of resins include the hydrophobic perfuming substances resulting from the extraction of labdanum resin, elemi resin, Peru balsam, tolu balsam, benzoin resin and myrrh tree resin.

The hydrophobic perfuming substances of plant origin resulting from the extraction of resins include incense, opoponax and guggul.

The hydrophobic perfuming substances of plant origin resulting from the extraction of herbs or grasses include the hydrophobic perfuming substances resulting from the extraction of tarragon, sage, thyme, basil and lemongrass.

The hydrophobic perfuming substances of plant origin resulting from the extraction of roots include the hydrophobic perfuming substances obtained from the extraction of roots of angelica, celery, cardamom, iris, acorus, cactus and vetiver.

The hydrophobic perfuming substances of plant origin resulting from the extraction of fruits or seeds include the hydrophobic perfuming substances resulting from the extraction of vanilla pods, coriander seeds, star anise seeds, fennel seeds, juniper berries, cardamom seeds, cumin seeds, cloves, tonka beans, bitter almonds and citrus fruits, such as lemon, lime, orange, mandarin or bergamot.

The hydrophobic perfuming substances of plant origin include extracts, absolutes, alcoholates and essential oils.

Essential oil denotes, in the present patent application, a fragrant product, meeting the definition adopted by the standard ISO 9235, generally of complex composition, obtained from a botanically defined plant raw material, either by steam distillation, or by dry distillation, or by an appropriate heating-free mechanical process. The essential oil is generally separated from the aqueous phase by a physical process which does not lead to a significant change in its composition. The plant raw material employed to obtain the essential oil can be fresh, withered, dry, whole, bruised or powdered. The essential oil can also undergo an appropriate subsequent process stage, such as a subsequent process stage making it possible to result in an essential oil which is terpene-free, sesquiterpene-free, rectified, devoid of an identified and named constituent, and decolored.

Terpene-free essential oil denotes an essential oil as defined above partially or completely devoid of monoterpene hydrocarbons.

Sesquiterpene-free essential oil denotes an essential oil as defined above partially or completely devoid of monoterpene and sesquiterpene hydrocarbons.

Rectified essential oil denotes an essential oil as defined above which has undergone a fractional distillation with the aim of removing certain constituents or of modifying the content thereof.

The essential oils as defined above comprise a mixture of different molecules and said essential oils can be classified into different families according to the chemical nature of their predominant components. Thus, it is possible to define:
 the class of essential oils rich in terpene hydrocarbons and in sesquiterpene hydrocarbons,
 the class of essential oils rich in compounds carrying an alcohol or monoterpinol functional group,
 the class of essential oils rich in compounds carrying an ester functional group,
 the class of essential oils rich in compounds carrying an aldehyde functional group,
 the class of essential oils rich in compounds carrying a ketone functional group,
 the class of essential oils rich in compounds carrying a phenolic functional group,
 the class of essential oils rich in compounds carrying an ether functional group,
 the class of essential oils rich in sesquiterpene oxides,
 the class of essential oils rich in compounds carrying at least one sulfur atom.

Essential oils rich in terpene hydrocarbons and in sesquiterpene hydrocarbons denotes essential oils comprising, per 100% of their weight, a proportion by weight of greater than or equal to 35% of said terpene hydrocarbons and sesquiterpene hydrocarbons.

Terpene and sesquiterpene hydrocarbons are chemical compounds derived from the oligomerization of isoprene.

Terpene hydrocarbons commonly present in essential oils include, for example, limonene, α-pinene, β-pinene, γ-pinene, sabinene, myrcene, terpinolene, camphene, cadinene, (Z)-β-ocimene, (E)-β-ocimene, α-terpinene, β-terpinene, γ-terpinene or para-cymene.

Sesquiterpene hydrocarbons commonly present in essential oils include, for example, (E)-β-farnesene, chamazulene, α-farnesene, germacrene D, β-caryophyllene, β-bourbonene, bicyclogermacrene, β-elemene, α-humulene, γ-cadinene, δ-cadinene, α-bulnesene, α-guaiene, seychellene, α-patchoulene, β-patchoulene or β-elemene.

Essential oils rich in terpene and sesquiterpene hydrocarbons include that of turpentine, juniper, lemon, patchouli, *rhododendron*, goldenrod, ylang-ylang III or ylang-ylang complete.

Essential oils rich in compounds carrying an alcohol functional group denotes essential oils comprising, per 100% of their weight, a proportion by weight of greater than or equal to 35% of compounds carrying an alcohol functional group.

Compounds carrying an alcohol functional group commonly present in essential oils include monoterpenols, such as linalool, geraniol, menthol, neomenthol, cis-sabinene hydrate, citronellol or α-terpineol, and sesquiterpenols. such as viridiflorol, trans-nerolidol, α-cadinol, t-cadinol, trans-farnesol, cis-farnesols, α-bisabolol, patchoulol or pogostol.

Essential oils rich in compounds carrying an alcohol functional group include that of geranium of Bourbon type, geranium Egypt, lavender aspic, rosalina, coriander, rosewood, rose flowers, palmarosa, peppermint, monarda, lavandin super, lavandin grosso or cabreuva.

Essential oils rich in compounds carrying an ester functional group denotes essential oils comprising, per 100% of their weight, a proportion by weight of greater than or equal to 35% of mixtures of compounds carrying an alcohol functional group and of compounds carrying an ester functional group.

Compounds carrying an ester functional group commonly present in essential oils include terpene esters, such as linalyl, menthyl, neomenthyl or geranyl acetate, citronellyl formate, isobutyl angelate, isoamyl angelate, methallyl angelate, propyl angelate or butyl angelate, phenolic esters, such as eugenyl acetate, or aromatic esters, such as methyl salicylate.

Essential oils rich in compounds carrying an ester functional group include that of wintergreen, roman chamomile, true Bulgarian lavender or fine lavender.

Essential oils rich in compounds carrying an aldehyde functional group denotes essential oils comprising, per 100% of their weight, a proportion by weight of greater than or equal to 35% of compounds carrying an aldehyde functional group.

Compounds carrying an aldehyde functional group commonly present in essential oils include terpene aldehydes, such as geranial, neral, isogeranial, isoneral, citronellal, citral or citronellal, or aromatic aldehydes, such as cinnamaldehyde.

Essential oils rich in compounds carrying an aldehyde functional group include that of cinnamon, lemongrass, lemon eucalyptus or *Eucalyptus citriodora.*

Essential oils rich in compounds carrying a ketone functional group denotes essential oils comprising, per 100% of their weight, a proportion by weight of greater than or equal to 35% of compounds carrying a ketone functional group.

Compounds carrying a ketone functional group commonly present in essential oils include, for example, camphor, carvone, thujone or menthone.

Essential oils rich in compounds carrying a ketone functional group include that of caraway, sage, thuja, fragrant dill, camphor tree or spearmint.

Essential oil rich in compounds carrying a phenolic functional group denotes essential oils comprising, per 100% of their weight, a proportion by weight of greater than or equal to 35% of compounds carrying a phenolic functional group.

Compounds carrying a phenolic functional group commonly present in essential oils include, for example, thymol, carvacrol, eugenol, isoeugenol or estragol.

Essential oils rich in compounds carrying a phenolic functional group include that of thyme, savory, oregano, Ceylon cinnamon, basil or clove.

Essential oils rich in compounds carrying an ether functional group denotes essential oils comprising, per 100% of their weight, a proportion by weight of greater than or equal to 35% of compounds carrying a ether functional group.

Compounds carrying an ether functional group commonly present in essential oils include, for example, anethole or eucalyptol.

Essential oils rich in compounds carrying an ether functional group include that of green anise, star anise, fennel, *Eucalyptus globulus*, sweet fennel or niaouli.

Essential oils rich in sesquiterpene oxides denotes essential oils comprising, per 100% of their weight, a proportion by weight of greater than or equal to 35% of compounds of sesquiterpene oxides type.

Compounds of sesquiterpene oxides type commonly present in essential oils include, for example, α-bisabolol oxide A, α-bisabolol oxide B, α-bisabolone oxide, 1,8-cineole, ascaridole or allicin.

Essential oils rich in compounds of the sesquiterpene oxides type include that of German chamomile, Madagascar helichrysum, cajuput or *chenopodium.*

Essential oils rich in compounds carrying at least one sulfur atom denotes essential oils comprising, per 100% of their weight, a proportion by weight of greater than or equal to 35% of compounds carrying at least one sulfur atom.

Compounds carrying at least one sulfur atom commonly present in essential oils include, for example, diallyl disulfide, diallyl trisulfide, diallyl tetrasulfide, diallyl sulfide, methyl allyl trisulfide or methyl allyl disulfide.

Essential oils rich in compounds carrying at least one sulfur atom include, for example, those of crucifers, liliaceae or garlic.

The hydrophobic perfuming substances of synthetic origin are chemical reaction between at least two chemical compounds, themselves of natural or synthetic origin.

The hydrophobic perfuming substances of synthetic origin include terpene hydrocarbons (monoterpenes and sesquiterpenes), such as myrcenes, limonenes, pinenes, camphene, cadinene, cedrene, farnesene, caryophyllene, chamazulene, 1,1-dimethoxy-2,2,5-trimethyl-4-hexene, limonenes, curcumene, crythmene, himachelenes, limonene, para-cymene, terpinenes and terpinolenes or vetivenes.

The hydrophobic perfuming substances of synthetic origin include esters, such as:
  benzyl, bornyl, citronellyl, cedryl, dihydromyrcenyl, dimethylbenzylcarbinyl, ethyl, farnesyl, fenchyl, hexyl, geranyl, isobutyl, isononyl, isopentyl, isobornyl, isopulegyl, linalyl, menthyl, methylphenylcarbinyl, neryl, nonyl, ortho-(tert-butyl)cyclohexyl, phenylethyl, para-(tert-butyl) cyclohexyl, phenethyl, prenyl, styrallyl, terpenyl, 4-(tert-butyl)cyclohexyl or vetiveryl acetates;
  benzyl, isobutyl or linalyl benzoates;
  ethyl, benzyl or isoamyl butanoates;
  benzyl, ethyl, isoamyl or linalyl butyrates;
  butyl or ethyl cinnamates;
  benzyl, citronellyl, geranyl or methyl formates;
  phenoxyethyl or cis-3-hexenyl isobutyrates;
  amyl, alkylcyclohexyl, allylcyclohexyl, linalyl, styrallyl or citronellyl propionates;
  methyl, benzyl or ethyl salicylates;

or also:
- methyl anthralinate, coumarin, hexyl tiglate, allyl caproate, hedione (methyl dihydrojasmonate), ethyl methylphenylglycidate, allyl amyl glycolate, allyl heptanoate, isoamyl methacrylate, ethyl naphtholate or hexyl neopentanoate.

The hydrophobic perfuming substances of synthetic origin include alcohols, such as benzyl alcohol, 3,7-dimethyl-1-octanol, isononyl alcohol, α-terpineol, menthol, linalool, citronellol, eucalyptol or 1,8-cineole, geraniol, phytol, isophytol, α-terpineol, tetrahydrolinalool, farnesol, carotol, nerol, globulol, vetiverol, nerolidol, dihydromyrcenol, tetrahydromyrcenol, fenchyl alcohol, dimethylbenzylcarbinol, cinnamyl alcohol, 2-phenylethanol or undecavertol.

The hydrophobic perfuming substances of synthetic origin include phenolic derivatives, such as anethole, safrole, isosafrole, eugenol, isoeugenol, guaiacol or 2-methoxyphenol, chavicol (or 4-allylphenol), estragole (or 1-allyl-4-methoxybenzene), cumic alcohol, thymol or para-cresol.

The hydrophobic perfuming substances of synthetic origin include aldehydes, such as phenylacetaldehyde, salicylaldehyde, anisaldehyde, caprylaldehyde, cinnamaldehyde, hexyl cinnamaldehyde, bourgeonal, citral (or neral), citronellal, hydroxycitronellal, citronellyloxyacetaldehyde, cyclamen aldehyde, cuminaldehyde, cyclal, 2,4-dimethyl-3-cyclohexene-1-carboxaldehyde (or ligustral), dodecanal, ethanal, octanal, decanal, geranials, heliional, lauraldehyde, lilial, methyl n-nonyl acetaldehyde, methyl octyl acetaldehyde, undecanal or vanillin.

The hydrophobic perfuming substances of synthetic origin include ketones, such as benzylacetone, calone (7-methyl-2H-benzo-1,5-dioxepin-3 (4H)-one), carvone, camphor, civetone, damascones, damascenones, ethyl amyl ketone, ethyl hexyl ketone, geranyl ketone, jasmone, irones, maltol (3-hydroxy-2-methyl-4H-pyran-4-one), ethyl maltol, menthone, isomenthone, muscone, methyl heptenone, ionones, such as methyl ionone, 4-methylacetophenone, methyl pentyl ketone, methyl heptyl ketone, methyl hexyl ketone, α-isomethyl ionone or methyl cedryl ketone.

The hydrophobic perfuming substances of synthetic origin include ethers, such as anethole, benzyl ethyl ether, cedryl methyl ether or p-cresyl methyl ether.

The hydrophobic perfuming substances of synthetic origin include nitriles, such as 3,5,7-trimethyloctane (ene) nitriles and their α-substituted derivatives, citronellyl nitrile, citronitrile or geranyl nitrile.

According to a more specific aspect, a subject matter of the invention is the use as described above for which the hydrophobic perfuming substance (A) is selected from the group consisting of essential oils of thyme, savory, oregano, Ceylon cinnamon, basil, clove, geranium of Bourbon type, geranium Egypt, lavender aspic, rosalina, coriander, rosewood, rose flowers, palmarosa, peppermint, monarda, lavandin super or lavandin grosso.

The expression "cosmetically acceptable" used in the definition of the aqueous phase ($P_2$) of the composition ($C_1$) provided in the form of an emulsion of oil-in-water type means, according to Council Directive 76/768/EEC of 27 Jul. 1976, amended by Council Directive 93/35/EEC of 14 Jun. 1993, any substance or preparation intended to be placed in contact with the various parts of the human body (epidermis, hair system, nails, lips and genital organs) or with the teeth and the mucous membranes of the oral cavity with a view exclusively or mainly to cleaning them, perfuming them, changing their appearance and/or correcting body odours and/or protecting them or keeping them in good condition.

A cosmetically acceptable medium of the composition ($C_1$) which is a subject matter of the invention can conventionally contain water, one or more cosmetically acceptable organic solvents, or a mixture of water and of one or more organic solvents. The cosmetically acceptable solvents can more particularly be chosen from polyhydric alcohols, such as, for example, glycerol, diglycerol, glycerol oligomers, ethylene glycol, propylene glycol, hexylene glycol, diethylene glycol, xylitol, erythritol, sorbitol, or water-soluble alcohols.

Preferably, a subject matter of the present invention is a composition ($C_1$) as defined above and for which:
- the emulsifying surfactant of water-in-oil type ($S_1$) comprises:
  - a composition of alkyl polyglycosides ($C'_1$) represented by the formula (I), in which the Rz radical represents the 2-octyl-1-dodecyl radical obtained from the deletion of the hydroxyl group of 2-octyl-1-dodecanol in the formula (II), and
  - 2-octyl-1-dodecanol represented by the formula (III),
- the emulsifying surfactant of oil-in-water type ($S_2$) comprises:
  - at least one compound of formula (IV), in which p is equal to 6 and the $R_1$—(C=O)— group represents the n-dodecanoyl radical, and
  - at least one composition ($C'_2$) represented by the formula (VI) in which the $R_3$ radical represents at least one radical chosen from the elements of the group consisting of the n-dodecyl radical, the n-tetradecyl radical and the n-hexadecyl radical, and
  - optionally at least one fatty alcohol of formula (VII) in which $R'_3$ represents a radical chosen from the elements of the group consisting of the n-dodecyl, n-tetradecyl and n-hexadecyl radicals,
- the hydrophobic perfuming substance (A) is chosen from the elements of the group consisting of Citrus Floral Chypre, Floral Woody Fruity, Floral Fruity, Fougère Fruity, Chypre Fruity, Chypre Floral, Woody Fruity, Spicy Floral Amber and Amber Floral Fruity.

According to another specific aspect, a subject matter of the present invention is a composition ($C_1$) as defined above and for which the ratio by weight of the emulsifying surfactant of oil-in-water type ($S_2$) to the emulsifying surfactant of water-in-oil type ($S_1$) is between 2.0/1 and 2.8/1, more particularly between 2.0/1 and 2.6/1.

The composition ($C_1$) which is a subject matter of the present invention as defined above is intended for a use targeted at perfuming the skin, hair, scalp, lips, clothes or household linen.

When the composition ($C_1$) which is a subject matter of the present invention as defined above is intended for a use targeted at perfuming the skin, hair, scalp or lips, it can additionally comprise excipients and/or active principles usually employed in the field of formulations for topical use, in particular cosmetic, dermocosmetic, pharmaceutical or dermopharmaceutical formulations.

The composition ($C_1$) which is a subject matter of the present invention can additionally comprise one or more auxiliary compounds chosen from foaming and/or detergent surfactants, thickening and/or gelling surfactants, stabilizing agents, film-forming compounds, solvents and cosolvents, hydrotropic agents, plasticizing agents, emulsifying and coemulsifying agents, opacifying agents, pearlescent agents, superfatting agents, sequestrants, chelating agents, antioxidants, preserving agents, conditioning agents, deodorants, bleaching agents intended for bleaching bodily hair and the skin, active principles intended to contribute a treating and/or protective action with regard to the skin or the hair, sunscreens, inorganic fillers or pigments, particles which give a visual effect or which are intended for the encapsulation of active principles, exfoliant particles, texturing agents, optical brighteners or insect repellents.

Mention may be made, as examples of foaming and/or detergent surfactants optionally present in the composition ($C_1$) which is a subject matter of the present invention, of topically acceptable foaming and/or detergent anionic, cationic, amphoteric or nonionic surfactants commonly used in this field of activity.

Mention may be made, among the foaming and/or detergent anionic surfactants which can be combined with the composition ($C_1$) which is a subject matter of the present invention, of alkali metal salts, alkaline earth metal salts, ammonium salts, amine salts or aminoalcohol salts of alkyl ether sulfates, of alkyl sulfates, of alkylamido ether sulfates, of alkylaryl polyether sulfates, of monoglyceride sulfates, of α-olefin sulfonates, of paraffin sulfonates, of alkyl phosphates, of alkyl ether phosphates, of alkyl sulfonates, of alkylamide sulfonates, of alkylaryl sulfonates, of alkyl carboxylates, of alkylsulfosuccinates, of alkyl ether sulfosuccinates, of alkylamide sulfosuccinates, of alkylsulfoacetates, of alkyl sarcosinates, of acylisethionates, of N-acyl taurates, of acyl lactylates, of N-acylated derivatives of amino acids, of N-acylated derivatives of peptides, of N-acylated derivatives of proteins, or of fatty acids.

Mention may be made, among the foaming and/or detergent amphoteric surfactants optionally present in the composition ($C_1$) which is a subject matter of the present invention, of alkylbetaines, alkylamidobetaines, sultaines, alkylamidoalkylsulfobetaines, imidazoline derivatives, phosphobetaines, amphopolyacetates and amphopropionates.

Mention may in particular be made, among the foaming and/or detergent cationic surfactants optionally present in the composition ($C_1$) which is a subject matter of the present invention, of quaternary ammonium derivatives.

Mention may more particularly be made, among the foaming and/or detergent nonionic surfactants optionally present in the composition ($C_1$) which is a subject matter of the present invention, of alkyl polyglycosides comprising a saturated or unsaturated and linear or branched aliphatic radical comprising from 8 to 12 carbon atoms; castor oil derivatives, polysorbates, coconut amides, N-alkylamines.

Mention may be made, as examples of thickening and/or gelling surfactants optionally present in the composition ($C_1$) which is a subject matter of the present invention, of:
optionally alkoxylated fatty esters of alkyl polyglycosides and very particularly ethoxylated esters of methyl polyglucoside, such as PEG 120 methyl glucose trioleate and PEG 120 methyl glucose dioleate, sold respectively under the names Glucamate™ LT and Glucamate™ DOE120;
alkoxylated fatty esters, such as PEG 150 pentaerythrityl tetrastearate, sold under the name Crothix™ DS53, or PEG 55 propylene glycol oleate, sold under the name Antil™ 141;
carbamates of polyalkylene glycols comprising fatty chains, such as PPG 14 laureth isophoryl dicarbamate, sold under the name Elfacos™ T211, or PPG 14 palmeth 60 hexyl dicarbamate, sold under the name Elfacos™ GT2125.

Mention may be made, as examples of deodorants optionally present in the composition ($C_1$) which is a subject of the present invention, of alkali metal silicates; zinc salts, such as zinc sulfate, zinc gluconate, zinc chloride or zinc lactate; quaternary ammonium salts, such as cetyltrimethylammonium salts or cetylpyridinium salts; glycerol derivatives, such as glyceryl caprate, glyceryl caprylate or polyglyceryl caprate; 1,2-decanediol, 1,3-propanediol; salicylic acid; sodium bicarbonate; cyclodextrins; metal zeolites; Triclosan™; aluminum bromohydrate, aluminum chlorohydrates, aluminum chloride, aluminum sulfate, aluminum zirconium chlorohydrates, aluminum zirconium trichlorohydrate, aluminum zirconium tetrachlorohydrate, aluminum zirconium pentachlorohydrate, aluminum zirconium octachlorohydrate, aluminum sulfate, sodium aluminum lactate, or complexes of aluminum chlorohydrate and of glycol, such as the complex of aluminum chlorohydrate and of propylene glycol, the complex of aluminum dichlorohydrate and of propylene glycol, the complex of aluminum sesquichlorohydrate and of propylene glycol, the complex of aluminum chlorohydrate and of polyethylene glycol, the complex of aluminum dichlorohydrate and of polyethylene glycol or the complex of aluminum sesquichlorohydrate and of polyethylene glycol.

Mention may be made, as examples of antioxidants optionally present in the composition ($C_1$) which is a subject matter of the present invention, of EDTA and its salts, citric acid, tartaric acid, oxalic acid, BHA (butylated hydroxyanisole), BHT (butylated hydroxytoluene), tocopherol derivatives, such as tocopherol acetate, mixtures of antioxidant compounds, such as Dissolvine GL 47S (INCI name: Tetrasodium Glutamate Diacetate).

Mention may be made, among the active principles which the composition ($C_1$) which is a subject matter of the present invention can comprise, of:
vitamins and their derivatives, in particular their esters, such as retinol (vitamin A) and its esters (retinyl palmitate, for example), ascorbic acid (vitamin C) and its esters, sugar derivatives of ascorbic acid (such as ascorbyl glucoside), tocopherol (vitamin E) and its esters (such as tocopherol acetate), vitamins B3 or B10 (niacinamide and its derivatives); compounds showing a soothing action, in particular Sepicalm™ S, allantoin and bisabolol; anti-inflammatory agents; compounds showing a moisturizing action, such as urea, hydroxyureas, glycerol glucoside, diglycerol glucoside, polyglyceryl glucosides, glycerol, diglycerol or xylityl polyglucoside, sold under the brand name Aquaxyl™; plant extracts rich in polyphenols, such as grape extracts, pine extracts, wine extracts or olive extracts; compounds showing a slimming or lipolytic action, such as caffeine or its derivatives, Adiposlim™, Adipoless™ or fucoxanthin; N-acylated proteins; N-acylated peptides, such as Matrixil™; N-acylated amino acids; partial hydrolysates of N-acylated proteins; amino acids; peptides; total hydrolysates of proteins; soybean extracts, for example Raffermine™; wheat extracts, for example Tensine™ or Gliadine™; plant extracts, such as plant extracts rich in tannins, plant extracts rich in isoflavones or plant extracts rich in terpenes; extracts of freshwater or marine algae; extracts of marine plants; marine extracts in general, such as corals; essential waxes; bacterial extracts; ceramides; phospholipids; compounds showing an antimicrobial action or a purifying action, such as Lipacide™ C8G, Lipacide™ UG, Sepicontrol™ A5, Octopirox™ or Sensiva™ SC50; compounds showing an energizing or stimulating property, such as Physiogenyl™, or panthenol and its derivatives, such as Sepicap™ MP; antiaging active ingredients, such as Sepilift™ DPHP, Lipacide™ PVB, Sepivinol™, Sepivital™, Manoliva™ Phyto-Age™, Timecode™ or Survicode™; antiphotoaging active principles; active principles which protect the integrity of the dermoepidermal junction; active principles which increase the synthesis of the components of the extracellular matrix, such as collagen, elastins or glycosaminoglycans; active principles which act favorably on chemical cell communication, such as cytokines, or physical cell communication, such as integrins; active principles which create a feeling of "heating" on the skin, such as activators of cutaneous microcirculation (such as nicotinic acid derivatives) or products which create a feeling of "coolness" on the skin (such as menthol and derivatives); active principles which improve cutaneous microcirculation, for example venotonics; draining active principles; active principles having a decongestant purpose, such as extracts of ginko biloba, ivy, horse chestnut, bamboo, ruscus, butcher's broom, Centalla asiatica, fucus, rosemary or willow; agents for tanning or browning the skin, such as, for example, dihydroxyacetone (DHA), erythrulose, mesotartaric aldehyde, glutaraldehyde, glyceraldehyde, alloxan, ninhydrin, plant extracts, such as, for example, extracts of red woods of the genus *Pterocarpus* and of the genus *Baphia*, such as *Pteropcarpus santalinus, Pterocarpus osun, Pterocarpus soyauxii, Pterocarpus erinaceus, Pterocarpus indicus* or *Baphia nitida*, such as those described in the European patent application EP 0 971 683; agents known for their action in facilitating and/or accelerating the tanning and/or browning of human skin, and/or for their action in coloring human skin, such as, for example, carotenoids (and more particularly β-carotene and γ-carotene), the product sold under the brand name "Carrot oil" (INCI name: *Daucus Carota, Helianthus Annuus* Sunflower Oil) by Provital, which contains carotenoids, vitamin E and vitamin K; tyrosine and/or its derivatives, known for their effect on the acceleration of the tanning of human skin in combination with exposure to ultraviolet radiation, such as, for example, the product sold under the brand name SunTan Accelerator™ by Provital, which contains tyrosine and riboflavins (vitamin B), the complex of tyrosine and of tyrosinase sold under the brand name Zymo Tan Complex by Zymo Line, the product sold under the brand name MelanoBronze™ (INCI name: Acetyl Tyrosine, Monk's Pepper Extract (Vitex Agnus-Castus)) by Mibelle which contains acetyl tyrosine, the product sold under the brand name Unipertan VEG-24/242/2002 (INCI name: Butylene Glycol and Acetyl Tyrosine and Hydrolyzed Vegetable Protein and Adenosine Triphosphate) by Unipex, the product sold under the brand name Try-Excell™ (INCI name: Oleoyl Tyrosine and Luffa *Cylindrica* (Seed) Oil and Oleic Acid) by Sederma which contains extracts of pumpkin seeds (or loofah oil), the product sold under the brand name Actibronze™ (INCI name: Hydrolyzed Wheat Protein and Acetyl Tyrosine and Copper Gluconate) by Alban Muller, the product sold under the brand name Tyrostan™ (INCI name: Potassium Caproyl Tyrosine) by Synerga, the product sold under the brand name Tyrosinol (INCI name: Sorbitan Isostearate, Glyceryl Oleate, Caproyl Tyrosine) by Synerga, the product sold under the brand name InstaBronze™ (INCI name: Dihydroxyacetone and Acetyl Tyrosine and Copper Gluconate) sold by Alban Muller, the product sold under the brand name Tyrosilane (INCI name: Methylsilanol and Acetyl Tyrosine) by Exymol; peptides known for their effect in activating melanogenesis, such as, for example, the product sold under the brand name Bronzing SF Peptide powder (INCI name: Dextran and Octapeptide-5) by Infinitec Activos, the product sold under the brand name Melitane (INCI name: Glycerin and Aqua and Dextran and Acetyl Hexapeptide-1) comprising acetyl hexapeptide-1 known for its α-MSH agonist action, the product sold under the brand name Melatimes Solutions™ (INCI name: Butylene Glycol, Palmitoyl Tripeptide-40) by Lipotec, sugars and sugar derivatives, such as, for example, the product sold under the brand name Tanositol™ (INCI name: Inositol) by Provital, the product sold under the brand name Thalitan™ (or Phycosaccharide™ AG) by Codif International (INCI name: Aqua and Hydrolyzed Algin (*Laminaria Digitata*) and Magnesium Sulfate and Manganese Sulfate) containing an oligosaccharide of marine origin (guluronic acid and mannuronic acid which are chelated with magnesium and manganese ions), the product sold under the brand name Melactiva™ (INCI name: Maltodextrin, *Mucuna Pruriens* Seed Extract) by Alban Muller, compounds rich in flavonoids, such as, for example, the product sold under the brand name Biotanning (INCI name: Hydrolyzed Citrus Aurantium *Dulcis* Fruit Extract) by Silab and known to be rich in lemon flavonoids (of hesperidins type).

Mention may be made, among the texturing agents which the composition ($C_1$) which is a subject matter of the present invention can comprise, of lauroyl lysine, sold under the name Aminohope™ LL by Ajinomoto, octenyl starch succinate, sold under the name Dryflo™ by National Starch, the myristyl polyglucoside sold by SEPPIC under the name Montanov™ 14, cellulose fibers, cotton fibers or chitosan fibers.

The composition ($C_1$) according to the invention and as defined above is obtained by the implementation of the preparation process comprising the following stages: A stage a) of preparation of the fatty phase ($P_1$) by mixing at least one oil and optionally at least one wax, at least one emulsifying surfactant of oil-in-water type ($S_2$), at least one hydrophobic perfuming substance (A) and at least one emulsifying surfactant of water-in-oil type ($S_1$) in the desired proportions. This mixing stage is generally carried out at a temperature of greater than or equal to 20° C. and less than or equal to 80° C., more particularly of greater than or equal to 25° C. and less than or equal to 80° C. and even more particularly of greater than or equal to 30° C. and less than or equal to 80° C.; it is carried out under mechanical stirring at a moderate speed of greater than or equal to 50 revolutions/minute and less than or equal to 100 revolutions/minute.

A stage b) of addition of the crosslinked anionic polyelectrolyte (AP) to the mixture prepared during stage a). This mixing stage is generally carried out at a temperature of greater than or equal to 20° C. and less than or equal to 80° C., more particularly of greater than or equal to 20° C. and less than or equal to 60° C. and even more particularly of greater than or equal to 20° C. and less than or equal to 40° C.; it is carried out under mechanical stirring at a moderate speed of greater than or equal to 500 revolutions/minute and less than or equal to 3000 revolutions/minute.

A stage c) of preparation of the aqueous phase ($P_2$) by mixing all the elements constituting it in the desired proportions. This mixing stage is generally carried out at a temperature of greater than or equal to 20° C. and less than or equal to 80° C., more particularly of greater than or equal to 20° C. and less than or equal to 60° C. and even more particularly of greater than or equal to 20° C. and less than or equal to 40° C.; it is carried out under mechanical stirring at a speed of greater than or equal to 500 revolutions/minute and less than or equal to 3000 revolutions/minute.

A stage d) during which the fatty phase ($P_1$) is added to the aqueous phase ($P_2$) at a temperature of greater than or equal to 20° C. and less than or equal to 80° C., more particularly of greater than or equal to 20° C. and less than or equal to 60° C. and even more particularly of greater than or equal to 20° C. and less than or equal to 40° C., under mechanical stirring at a speed of greater than or equal to 2000 revolutions/minute and less than or equal to 6000 revolutions/minute, so as to obtain the composition according to the invention.

Another subject matter of the present invention is a process for perfuming the skin, hair, scalp, lips, clothes or household linen, characterized in that it comprises at least one stage of application to said skin, hair, scalp, lips, clothes or household linen of the composition ($C_1$) as defined above.

Within the meaning of the present invention, "household linen" denotes all the pieces of fabric intended for domestic use, such as, for example, table linen, such as tablecloths, table napkins or table mats; kitchen and housework linen, such as dustcloths, dish towels or floorcloths; bed linen, such as blankets, bedspreads, sheets, fitted sheets, duvet covers, lap robes, pillowcases, bolster cases, duvets, undersheets, eiderdowns, pillows or bolsters; bath and/or toilet linen, such as wash cloths, bath towels or beach towels; handkerchiefs; curtains and net curtains.

The composition ($C_1$) according to the invention can be packaged in the form of bottles, spray bottles, pump-action sprays, roll-ons or tubes.

Another subject matter of the invention is thus a container, preferably a bottle, comprising a spraying means and a packaging means, and containing a composition ($C_1$) as defined above.

According to a specific aspect, the spraying means included in the container which is a subject matter of the present invention is a manual pump.

The composition ($C_1$) according to the invention can thus be applied in the form of fine liquid particles by means of pressurization devices. The devices in accordance with the invention are well known to a person skilled in the art and comprise non-aerosol pumps or "atomizers", aerosol containers comprising a propellant and also pumps.

The following examples illustrate the invention without, however, limiting it.

DESCRIPTION OF THE PREFERRED EMBODIMENTS

Preparation and evaluation of oil-in-water emulsions according to the invention and of comparative oil-in-water emulsions.

1) Preparation of the Emulsions According to the Invention and of the Comparative Emulsions Six emulsions according to the invention, denoted ($F_1$) to ($F_6$), and eight comparative emulsions, denoted ($E_1$) to ($E_5$), the proportions by weight of the constituents of which are recorded in table 1 below, are prepared, the contents by weight of the polyelectrolytes being indicated as percentage of polymeric dry matter, by employing the process below.

The constituents of the fatty phase are introduced successively into a beaker, mixed and brought to a temperature of 20° C. after a stage of heating at 40° C.; the mixing is carried out using a mechanical stirrer equipped with a propeller-type stirring rotor, at a speed of 100 revolutions/minute.

The constituents of the dispersed phase are mixed at ambient temperature in a beaker using a mechanical stirrer at a speed of 2000 revolutions/minute and the thickening agent is then gradually added.

The aqueous phase is added in one go to the fatty phase at ambient temperature and at a stirring speed of 4000 revolutions/minute with a stirrer equipped with a shearing rotor. This stirring is then maintained for five minutes. The preserving agent is subsequently added and the resulting mixture is mixed at ambient temperature and at a stirring speed of 4000 revolutions/minute with a stirrer equipped with a shearing rotor. The emulsion obtained is then drained out.

TABLE 1

Compositions ($F_1$), ($F_2$), ($F_3$), ($F_4$), ($F_5$) and ($F_6$) according to the invention

|  | ($F_1$) | ($F_2$) | ($F_3$) | ($F_4$) | ($F_5$) | ($F_6$) |
| --- | --- | --- | --- | --- | --- | --- |
| Phase A |  |  |  |  |  |  |
| Water | 60% | 60% | 60% | 60% | 60% | 60% |
| Fluidifeel Easy[1] | 1.2% | 1.2% | 1.2% | 1.2% | 1.2% | 1% |
| Emogreen L 15[2] | 2% | 0% | 2% | 0% | 2% | 2% |
| $C_8$—$C_{10}$ triglyceride[3] | 0% | 2% | 0% | 2% | 0% | 0% |
| "Raspberry" perfume[4] | 2.5% | 0% | 2.5% | 0% | 2.5% | 2.5% |
| "Citrus tonic" perfume[5] | 0% | 2.5% | 0% | 2.5% | 0% | 0% |
| Sepinov ™ EMT 10[6] | 0.4% | 0.4% | 0% | 0% | 0% | 0% |
| Sepimax ™ Zen[8] | 0% | 0% | 0.4% | 0.4% | 0.2% | 0.2% |
| Fluidanov ™ 20X[7] | 0.5% | 0.5% | 0.5% | 0.5% | 0.5% | 0.5% |
| Fluidifeel Easy[1]/ Fluidanov ™ 20X[7] ratio | 2.4/1 | 2.4/1 | 2.4/1 | 2.4/1 | 2.4/1 | 2/1 |
| Phase B |  |  |  |  |  |  |
| Water | q.s. 100% | q.s. 100% | q.s. 100% | q.s. 100% | q.s. 100% | q.s. 100% |
| Phase C |  |  |  |  |  |  |
| Euxyl ™ PE 9010[9] | 1% | 1% | 1% | 1% | 1% | 1% |

TABLE 2

Comparative compositions ($E_1$), ($E_2$), ($E_3$), ($E_4$), ($E_5$), ($E_6$), ($E_7$) and ($E_8$)

|  | ($E_1$) | ($E_2$) | ($E_3$) | ($E_4$) | ($E_5$) | ($E_6$) | ($E_7$) | ($E_8$) |
| --- | --- | --- | --- | --- | --- | --- | --- | --- |
| Phase A |  |  |  |  |  |  |  |  |
| Water | 60% | 60% | 60% | 60% | 60% | 60% | 60% | 60% |
| Fluidifeel Easy[1] | 1.2% | 1.2% | 1.2% | 1.2% | 1.5% | 1.5% | 1.5% | 1.5% |
| Emogreen L 15[2] | 2% | 0% | 2% | 0% | 2% | 0% | 2% | 0% |

TABLE 2-continued

Comparative compositions (E₁), (E₂), (E₃), (E₄), (E₅), (E₆), (E₇) and (E₈)

| | (E₁) | (E₂) | (E₃) | (E₄) | (E₅) | (E₆) | (E₇) | (E₈) |
|---|---|---|---|---|---|---|---|---|
| $C_8$—$C_{10}$ triglyceride[3] | 0% | 2% | 0% | 2% | 0% | 2% | 0% | 2% |
| "Raspberry" perfume[4] | 2.5% | 0% | 2.5% | 0% | 2.5% | 0% | 2.5% | 0% |
| "Citrus tonic" perfume[5] | 0% | 2.5% | 0% | 2.5% | 0% | 2.5% | 0% | 2.5% |
| Sepinov™ EMT 10 [6] | 0.4% | 0.4% | 0% | 0% | 0.4% | 0.4% | 0.4% | 0.4% |
| Sepimax™ Zen | 0% | 0% | 0.4% | 0.4% | 0% | 0% | 0% | 0% |
| Fluidanov™ 20X[7] | 0% | 0% | 0% | 0.5% | 0.5% | 0.5% | 1% | 1% |
| Fluidifeel Easy[1]/ Fluidanov™ 20X[7] ratio | — | — | — | 2.4/1 | 3/1 | 3/1 | 3/2 | 3/2 |
| Phase B | | | | | | | | |
| Water | q.s. 100% | q.s. 100% | q.s. 100% | q.s. 100% | q.s. 100% | q.s. 100% | q.s. 100% | q.s. 100% |
| Phase C | | | | | | | | |
| Euxyl™ PE 9010[9] | 1% | 1% | 1% | 1% | 1% | 1% | 1% | 1% |

(1): Fluidifeel™ Easy is a mixture of lauryl polyglucoside with a degree of polymerization of 1.20, of myristyl polyglucoside with a degree of polymerization of 1.20 and of polyglyceryl-6 laurate, used as emulsifying agent of oil-in-water type to prepare cosmetic emulsions.

(2): Emogreen L 15 is a mixture of linear alkanes, isoalkanes and cycloalkanes comprising from 15 to 19 carbon atoms used as an emollient agent for the preparation of cosmetic formulations.

(3): Caprylic/capric triglycerides is a mixture of equal weights of glyceryl trioctanoate and glyceryl tridecanoate.

(4) "Raspberry" perfume (or "raspberry in blue" by Luzi No. 650074) is a fruity fragrance with a floral and woody tendency.

(5) "Citrus tonic" perfume (or Tonic E) supplied by Mane is a fresh, floral and musky fragrance.

(6) Sepinov™ EMT 10: Polymeric thickening agent (INCI name: Hydroxyethyl Acrylate/Acryloyldimethyltaurate Acrylate Copolymer), used as rheology modifier for cosmetic formulations.

(7) Fluidanov™ 20× is a mixture comprising, per 100% of its weight, from 70% to 90% by weight of 2-octyl-1-dodecanol and from 10% to 30% by weight of 2-octyl-1-dodecyl polyxyloside.

(8) Sepimax™ Zen (INCI name: Polyacrylate Crosspolymer-6) is a polymeric thickening agent used as rheology modifier for cosmetic formulations.

(9): Euxyl™ PE9010 (INCI name: Phenoxyethanol & Ethylhexylglycerin): composition used as preserving agent.

2) Evaluation of the Properties of the Emulsions According to the Invention and of the Comparative Emulsions 2.1 Evaluation of the Stability of the Compositions ($F_1$) to ($F_6$) According to the Invention and of the Comparative Compositions ($E_1$) to ($E_8$)

a) An amount of 100 ml of the composition to be tested and contained in a 250 ml flask is introduced into a climate-controlled chamber regulated at 25° C., for a period of time of one month.

The visual appearance of the composition tested is evaluated before stabilizing in the chamber and after a period of time of one month in said climate-controlled chamber, which appearance will be described according to observation either as "Homogeneous", meaning a stability of the composition tested, or as "Heterogeneous", meaning an instability of the composition tested.

b) An amount of 100 ml of the composition to be tested and contained in a 250 ml flask is introduced into a climate-controlled chamber regulated at 45° C., for a period of time of one month.

The visual appearance of the composition tested is evaluated before stabilizing in the chamber and after a period of time of one month in said climate-controlled chamber, which appearance will be described according to observation either as "Homogeneous", meaning a stability of the composition tested, or as "Heterogeneous", meaning an instability of the composition tested.

c) The results obtained are recorded in table 3 below.

2.2 Evaluation of the Spray Factor of the Compositions ($F_1$) to ($F_6$) according to the invention and of the comparative compositions ($E_1$) to ($E_5$)

Principle: the objective of this test is to assess the quality of emission of fluid compositions through a spray nozzle.

This involves measuring the emission surface area of the fluid on a cardboard support positioned at a fixed distance from the spray packaging, so as to qualitatively assess the spraying of the fluid tested.

Thus, the fluids which are emitted in the form of a jet, with a very small spray surface area, do not offer a good spray, whereas the fluids emitted in the form of a high surface area provide a high spray quality.

Protocol:

The products to be tested are packaged in test bottles 24 hours before carrying out the evaluation and stored in a climatic-controlled chamber, the temperature of which is regulated at 20° C.

The 100 ml glass bottles are equipped with a spray nozzle of Pompa AVLP 18/415 type sold by Eurovetrocap SPA.

Cardboard folders are cut into strips 16 centimeters high and fixed to a support at a distance of 7 centimeters from the body of the spray bottle.

The spray devices are primed once and then a second priming pressure is applied before taking the measurements.

The spray devices are placed on the support 7 centimeters from the strip of cardboard folder, the nozzle facing said strip of cardboard.

Two consecutive pressures are then applied and the appearance of a damp stain on the strip of cardboard, in the form of a circular surface area, is observed.

The following are then measured, for each composition, without taking into account the scattered specks:
- the distance $L_{1i}$ corresponding to the width of the circular stain
- the distance $L_{2i}$ corresponding to the width of the circular stain Four measurements are carried out for each composition tested.

For each series of compositions for which it is desired to evaluate the spray factor, these measurements are also carried out with a suitable control fluid, in the case in point here with demineralized water and namely:
- the distance $L_{1w}$ corresponding to the width of the circular stain of the sprayed water
- the distance $L_{2w}$ corresponding to the width of the circular stain of the sprayed water.

The surface area is subsequently calculated for each composition (i) tested and for the water, followed by the "spray factor", as follows:
- surface area composition tested (Si): $Si = L_{1i} \times Li \times \pi/4$
- surface area water (Sw): $Sw = L_{1w} \times L_{2w} \times \pi/4$
- spray factor (in %): $SF = (Si/Sw) \times 100$ In the context of the present invention relating to perfuming compositions, a spray factor (SF) will be deemed satisfactory and meeting the needs of the technical problem if it is greater than or equal to 50%, more particularly greater than or equal to 60%.

2.3 Results.

The results of the evaluations obtained for the compositions ($F_1$) to ($F_6$) according to the invention are recorded in table 3 below and those obtained for the comparative compositions ($E_1$) to ($E_8$) are recorded in table 4 below.

TABLE 3

Evaluation of the stability and of the spray factor of the compositions ($F_1$), ($F_2$), ($F_3$), ($F_4$), ($F_5$) and ($F_6$) according to the invention.

| | ($F_1$) | ($F_2$) | ($F_3$) | ($F_4$) | ($F_5$) | ($F_6$) |
|---|---|---|---|---|---|---|
| Stability one month 45° C. | Homogeneous liquid | Homogeneous liquid | Homogeneous liquid | Homogeneous liquid | Homogeneous liquid | Homogeneous liquid |
| Stability one month 25° C. | Homogeneous liquid | Homogeneous liquid | Homogeneous liquid | Homogeneous liquid | Homogeneous liquid | Homogeneous liquid |
| Spray factor (SF) in % | 80% | 100% | 68% | 79% | 90% | 100% |

TABLE 4

Evaluation of the stability and of the spray factor of the comparative compositions ($E_1$), ($E_2$), ($E_3$), ($E_4$), ($E_5$), ($E_6$), ($E_7$) and ($E_8$)

| | ($E_1$) | ($E_2$) | ($E_3$) | ($E_4$) | ($E_5$) | ($E_6$) | ($E_7$) | ($E_8$) |
|---|---|---|---|---|---|---|---|---|
| Stability one month 45° C. | Heterogeneous | Heterogeneous | Heterogeneous | Heterogeneous | Heterogeneous | Heterogeneous | Heterogeneous | Heterogeneous |
| Stability one month 25° C. | Heterogeneous | Stable | Homogeneous | Homogeneous | Heterogeneous | Heterogeneous | Heterogeneous | Heterogeneous |
| Spray factor (SF) in % | n.m. | n.m. | n.m. | n.m. | n.m. | n.m. | n.m. | n.m. |

2.4 Comments.

The results obtained show the need to include an emulsifying surfactant of water-in-oil type ($S_1$), in this instance a composition of 2-octyldodecyl polyxyloside and of 2-octyl-1-dodecanol, in the perfuming composition in order to achieve the stability of the perfuming composition at 25° C. and 45° C., as shown by comparing ($F_1$) and ($E_1$), ($F_2$) and ($E_2$), ($F_3$) and ($E_3$), and ($F_4$) and ($E_4$). These results show the presence of this stabilizing technical effect for different perfumed substances and for different anionic polyelectrolytes (Sepimax™ Zen comprising a crosslinked anionic polyelectrolyte, the polymeric backbone of which comprises in particular a monomeric unit of formula (M1) and of hydrophobic nature, whereas the crosslinked anionic polyelectrolyte contained in Sepinov™ EMT10 is a crosslinked copolymer comprising only hydrophilic units).

The compositions according to the invention are also characterized by high spray factors, some of them being as effective as a spray of demineralized water used as positive control.

The invention claimed is:

1. A perfuming composition provided in the form of an emulsion of oil-in-water type and comprising:
   a) at least one oil,
   b) at least one crosslinked anionic polyelectrolyte,
   c) at least one emulsifying surfactant of water-in-oil type comprising an alkyl polyxyloside possessing a nonlinear branched alkyl radical and comprising from 10 to 36 carbon atoms,
   d) at least one emulsifying surfactant of oil-in-water type,
   e) at least one hydrophobic perfuming substance, and
   f) water,
   wherein a weight ratio of the emulsifying surfactant of oil-in-water type ($S_2$) to the emulsifying surfactant of water-in-oil type ($S_1$) is between 2.0/1 and 2.8/1.

2. The composition as claimed in claim 1, comprising, per 100% of its weight:
   a) from 1% to 30% by weight of oil;
   b) from 0.05% to 2.5% by weight of the crosslinked anionic polyelectrolyte;
   c) from 0.05% to 2.5% by weight of the surfactant of water-in-oil type;
   d) from 0.5% to 5% by weight of the surfactant of oil-in-water type;
   e) from 0.5% to 10% by weight of the hydrophobic perfuming substance;
   f) from 50% to 97.9% by weight of water.

3. The composition as claimed in claim 1, wherein the emulsifying surfactant of water-in-oil type comprises at least one composition of alkyl polyglycosides represented by the formula (I):

$$R_2-O-(X)_x-H \qquad (I)$$

in which x represents a decimal number of between 1.05 and 2.5, X represents the xylosyl or α,β-D-xylopyranosyl radical, obtained from the deletion of the hemiacetal hydroxyl group of α,β-D-xylopyranose, and $R_2$ represents a radical of formula (II):

$$CH(C_tH_{2t+1})(C_vH_{2v+1})CH_2- \qquad (II)$$

in which t is an integer of between 6 and 18, v is an integer of between 4 and 18 and the sum t+v is greater than or equal to 10 and less than or equal to 22.

4. The composition as claimed in claim 3, wherein the composition of alkyl polyglycosides consists of a mixture of compounds represented by the formulae ($I_1$), ($I_2$), ($I_3$), ($I_4$) and ($I_5$):

$$R_2-O-(X)_1-H \qquad (I_1)$$

$$R_2-O-(X)_2-H \qquad (I_2)$$

$$R_2-O-(X)_3-H \qquad (I_3)$$

$$R_2-O-(X)_4-H \qquad (I_4)$$

$$R_2-O-(X)_5-H \qquad (I_5)$$

in the respective molar proportions a1, a2, a3, a4 and a5, such that:
the sum a1+a2+a3+a4+a5 is equal to 1, and that
the sum a1+2a2+3a3+4a4+5a5 is equal to x.

5. The composition as claimed in claim 3, wherein the emulsifying surfactant of water-in-oil type comprises a fatty alcohol of formula (III):

$$CH(C_tH_{2t+1})(C_vH_{2v+1})CH_2-OH \qquad (III),$$

in which t is an integer of between 6 and 18, v is an integer of between 4 and 18 and the sum t+v is greater than or equal to 14.

6. The composition as claimed in claim 1, wherein the emulsifying surfactant of oil-in-water type comprises:
a compound of formula (IV):

$$R_1-(C=O)-[O-CH_2-CH(OH)-CH_2]_p-OH \qquad (IV),$$

in which p represents an integer greater than or equal to 1 and less than or equal to 15 and in which the group $R_1-(C=O)-$ represents a saturated or unsaturated and linear or branched acyl radical comprising from 6 to 22 carbon atoms, and/or
a composition of alkyl polyglycosides represented by the formula (VI):

$$R_3-O-(G)_{x'}-H \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and $R_3$ represents a radical chosen from the elements of the group consisting of the n-dodecyl, n-tetradecyl, n-hexadecyl, n-octadecyl, n-eicosyl and n-behenyl radicals.

7. The composition as claimed in claim 6, wherein the composition of alkyl polyglycosides consists of a mixture of compounds represented by the formulae ($VI_1$), ($VI_2$), ($VI_3$), ($VI_4$) and ($VI_5$):

$$R_3-O-(G)_1-H \qquad (VI_1)$$

$$R_3-O-(G)_2-H \qquad (VI_2)$$

$$R_3-O-(G)_3-H \qquad (VI_3)$$

$$R_3-O-(G)_4-H \qquad (VI_4)$$

$$R_3-O-(G)_5-H \qquad (VI_5)$$

in the respective molar proportions a1, a2, a3, a4 and a5, such that:
the sum a1+a2+a3+a4+a5 is equal to 1, and that
the sum a1+2a2+3a3+4a4+5a5 is equal to x.

8. The composition as claimed in claim 6, wherein the emulsifying surfactant of oil-in-water type comprises a compound of formula (IV) and at least one compound of formula (V):

$$HO-[CH_2-CH(OH)-CH_2-O]_n-H \qquad (V),$$

in which n, which is identical to or different from p, represents an integer of greater than or equal to 1 and of less than or equal to 15.

9. The composition as claimed in claim 6, wherein the emulsifying surfactant of oil-in-water type comprises a composition of alkyl polyglycosides and a fatty alcohol of formula (VII):

$$R'_3\text{—OH} \qquad (VII),$$

in which R'$_3$ represents a radical chosen from the elements of the group consisting of the n-dodecyl, n-tetradecyl, n-hexadecyl, n-octadecyl, n-eicosyl and n-behenyl radicals, and with R'$_3$ identical to or different from R$_3$.

10. The composition as claimed in claim 3, wherein the R$_2$ radical represents the 2-octyl-1-dodecyl radical in the formula (II) obtained from the deletion of the hydroxyl group of 2-octyl-1-dodecanol, and for which t is equal to 10 and v is equal to 8 in the formula (II).

11. The composition as claimed in claim 1, wherein the crosslinked anionic polyelectrolyte comprises a proportion of greater than or equal to 25 mol % of monomer units resulting from 2-methyl-2-[(1-oxo-2-propenyl)amino]-1-propanesulfonic acid in free acid or partially or completely salified form.

12. The composition as claimed in claim 1, wherein the hydrophobic perfuming substance is chosen from the elements of the group consisting of the following olfactory families: Citrus, Floral, Fougère, Chypre, Woody.

13. A process for perfuming the skin, hair, scalp, lips, clothes or household linen, the process comprising at least one stage of applying to said skin, hair, scalp, lips, clothes or household linen of the composition as defined in claim 1.

14. A container comprising a spraying means and a packaging means, and containing a composition as defined in claim 1.

15. The composition as claimed in claim 2, wherein the emulsifying surfactant of water-in-oil type comprises at least one composition of alkyl polyglycosides represented by the formula (I):

$$R_2\text{—O—(X)}_x\text{—H} \qquad (I)$$

in which x represents a decimal number of between 1.05 and 2.5, X represents the xylosyl or α,β-D-xylopyranosyl radical, obtained from the deletion of the hemiacetal hydroxyl group of α,β-D-xylopyranose, and R$_2$ represents a radical of formula (II):

$$\text{CH}(C_tH_{2t+1})(C_vH_{2v+1})\text{CH}_2\text{—} \qquad (II)$$

in which t is an integer of between 6 and 18, v is an integer of between 4 and 18 and the sum t+v is greater than or equal to 10 and less than or equal to 22.

16. The composition as claimed in claim 4, wherein the emulsifying surfactant of water-in-oil type comprises a fatty alcohol of formula (III):

$$\text{CH}(C_tH_{2t+1})(C_vH_{2v+1})\text{CH}_2\text{—OH} \qquad (III),$$

in which t is an integer of between 6 and 18, v is an integer of between 4 and 18 and the sum t+v is greater than or equal to 14.

17. The composition as claimed in claim 2, wherein the emulsifying surfactant of oil-in-water type comprises:
a compound of formula (IV):

$$R_1\text{—(C=O)—[O—CH}_2\text{—CH(OH)—CH}_2]_p\text{—OH} \qquad (IV),$$

in which p represents an integer greater than or equal to 1 and less than or equal to 15 and in which the group R$_1$—(C=O)— represents a saturated or unsaturated and linear or branched acyl radical comprising from 6 to 22 carbon atoms, and/or
a composition of alkyl polyglycosides represented by the formula (VI):

$$R_3\text{—O-(G)}_{x'}\text{—H} \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and R$_3$ represents a radical chosen from the elements of the group consisting of the n-dodecyl, n-tetradecyl, n-hexadecyl, n-octadecyl, n-eicosyl and n-behenyl radicals.

18. The composition as claimed in claim 3, wherein the emulsifying surfactant of oil-in-water type comprises:
a compound of formula (IV):

$$R_1\text{—(C=O)—[O—CH}_2\text{—CH(OH)—CH}_2]_p\text{—OH} \qquad (IV),$$

in which p represents an integer greater than or equal to 1 and less than or equal to 15 and in which the group R$_1$—(C=O)— represents a saturated or unsaturated and linear or branched acyl radical comprising from 6 to 22 carbon atoms, and/or
a composition of alkyl polyglycosides represented by the formula (VI):

$$R_3\text{—O-(G)}_{x'}\text{—H} \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and R$_3$ represents a radical chosen from the elements of the group consisting of the n-dodecyl, n-tetradecyl, n-hexadecyl, n-octadecyl, n-eicosyl and n-behenyl radicals.

19. The composition as claimed in claim 4, wherein the emulsifying surfactant of oil-in-water type comprises:
a compound of formula (IV):

$$R_1\text{—(C=O)—[O—CH}_2\text{—CH(OH)—CH}_2]_p\text{—OH} \qquad (IV),$$

in which p represents an integer greater than or equal to 1 and less than or equal to 15 and in which the group R$_1$—(C=O)— represents a saturated or unsaturated and linear or branched acyl radical comprising from 6 to 22 carbon atoms, and/or
a composition of alkyl polyglycosides represented by the formula (VI):

$$R_3\text{—O-(G)}_{x'}\text{—H} \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and R$_3$ represents a radical chosen from the elements of the group consisting of the n-dodecyl, n-tetradecyl, n-hexadecyl, n-octadecyl, n-eicosyl and n-behenyl radicals.

20. The composition as claimed in claim 5, wherein the emulsifying surfactant of oil-in-water type comprises:
a compound of formula (IV):

$$R_1\text{—(C=O)—[O—CH}_2\text{—CH(OH)—CH}_2]_p\text{—OH} \qquad (IV),$$

in which p represents an integer greater than or equal to 1 and less than or equal to 15 and in which the group R$_1$—(C=O)— represents a saturated or unsaturated and linear or branched acyl radical comprising from 6 to 22 carbon atoms, and/or
a composition of alkyl polyglycosides represented by the formula (VI):

$$R_3\text{—O-(G)}_{x'}\text{—H} \qquad (VI)$$

in which x' represents a decimal number of between 1.05 and 2.5, G represents the glucosyl or α,β-D-glucopyranosyl radical, obtained from the deletion of the hemiacetal hydroxyl group of α,β-D-glucopyranose, and $R_3$ represents a radical chosen from the elements of the group consisting of the n-dodecyl, n-tetradecyl, n-hexadecyl, n-octadecyl, n-eicosyl and n-behenyl radicals.

* * * * *